United States Patent [19]
Arai et al.

[11] Patent Number: 5,090,849
[45] Date of Patent: Feb. 25, 1992

[54] ROTARY CUTTING TOOL

[75] Inventors: Tatsuo Arai; Katsumi Haga; Takayoshi Saito; Hidehisa Shiratori; Ryoei Hasegawa; Kazuo Iizuka, all of Tokyo, Japan

[73] Assignee: Mitsubishi Materials Corporation, Tokyo, Japan

[21] Appl. No.: 545,626

[22] Filed: Jun. 29, 1990

[30] Foreign Application Priority Data

| Jul. 4, 1989 | [JP] | Japan | 1-172508 |
| Mar. 28, 1990 | [JP] | Japan | 2-80159 |
| Jun. 15, 1990 | [JP] | Japan | 2-157346 |

[51] Int. Cl.⁵ .................................. B23C 7/00
[52] U.S. Cl. ................................ 409/137; 408/61
[58] Field of Search ............ 409/137, 134; 408/61, 408/56, 241 R, 241 G; 407/33, 51, 115

[56] References Cited

U.S. PATENT DOCUMENTS

| 1,990,991 | 2/1935 | Heubach | 409/137 |
| 2,944,465 | 7/1960 | Jones | 409/137 |
| 3,167,260 | 1/1965 | Gibbons et al. | 409/137 X |
| 3,899,814 | 8/1975 | Kralowetz | 409/137 X |
| 4,011,792 | 3/1977 | Davis | 409/137 |
| 4,037,982 | 7/1977 | Clement | 409/137 X |
| 4,563,115 | 1/1986 | Abe et al. | 409/137 |
| 4,915,550 | 4/1990 | Arai et al. | 408/61 |
| 5,017,060 | 5/1991 | Shiratori et al. | 409/137 |
| 5,026,221 | 6/1991 | Arai et al. | 409/137 |

FOREIGN PATENT DOCUMENTS

| 1077031 | 3/1960 | Fed. Rep. of Germany . |
| 3333267 | 3/1984 | Fed. Rep. of Germany . |
| 63-136146 | 9/1988 | Japan . |
| 63-144146 | 9/1988 | Japan . |
| 1-153247 | 6/1989 | Japan . |
| 1-41556 | 12/1989 | Japan . |
| 87107131 | 8/1986 | U.S.S.R. . |
| 798380 | 7/1958 | United Kingdom ............ 409/137 |

Primary Examiner—William Briggs
Attorney, Agent, or Firm—Cushman, Darby & Cushman

[57] ABSTRACT

In a rotary cutting tool for use with at least one cutting insert, a cutter body is rotatable about a rotational axis. The cutting insert is mounted to an outer periphery of a forward end of the cutter body. A chip moving unit is arranged outwardly of an outer peripheral surface of the cutter body for moving chips generated by the cutting insert, to a desirable location. A cover assembly is provided for covering the outer peripheral surface of the cutter body, having a flow passageway defined between an inner peripheral surface of the cover assembly and the outer peripheral surface of the cutter body. An air sending assembly is arranged within the flow passageway for sending air adjacent the cutting insert, toward the desirable location during rotation of the cutter body about the rotational axis.

27 Claims, 19 Drawing Sheets

ROTARY CUTTING TOOL

BACKGROUND OF THE INVENTION

The present invention relates to rotary cutting tools for use chiefly in surface cutting such as, for example, a face milling cutter or the like and, more particularly, to a rotary cutting tool capable of successively processing chips generated during cutting.

Referring to FIGS. 40 through 42 of the attached drawings, there is shown a face milling cutter which is an example of the conventional rotary cutting tools for use in surface cutting of a workpiece.

The face milling cutter has a cutter body 1 substantially in the form of a cylinder. A plurality of insert mounting seats 2 are formed at an outer periphery of a forward end of the cutter body 1 in circumferentially equidistantly spaced relation to each other, and open toward the forward-end face and an outer peripheral surface of the cutter body 1. One or a plurality of cutting insert 3 are detachably mounted respectively to the insert mounting seats 2 by respective wedge elements 5 which are tightened respectively by clamp screws 4.

On the other hand, chip pockets 6 having their respective arcuate wall surfaces are formed on the outer peripheral surface of the cutter body 1 at respective locations which face toward cutting face of the respective insert 3. A central bore 7 is formed at a center of the cutter body 1 and extends axially therethrough.

In the face milling cutter constructed as above, an arbor 10 is mounted to a main spindle 8 of a machine body through a plurality of keys 9. The arbor 10 has a fitting shaft 10a which is fitted in the central bore 7 in the cutter body 1. A tightening bolt 12 is screwed into the fitting shaft 10a. Thus, the cutter body 1 is fixedly mounted together to the main spindle 8. Under this condition, the cutter body 1 is rotated about the axis of the main spindle 8 by the same, and is fed in a direction perpendicular to the axis of the spindle 8. In this manner, a surface of the workpiece is processed by the insert 3. Chips generated at this time are guided by the wall surfaces of the respective chip pockets 6 from faces 3b of the respective insert 3, and are rounded off. The rounded-off chips are discharged peripherally outwardly of the cutter body 1.

The face milling cutter described above has the following drawback or disadvantage. That is, since the face milling cutter merely guides and discharges the generated chips peripherally outwardly of the face milling cutter, the chips are accumulated adjacent the insert 3. As a result, not only is the operational environment deteriorated, but also a danger sometimes occurs during operation. Further, a considerable time is taken to process the chips after completion of the cutting.

Moreover, the conventional face milling cutter has also the following disadvantage. That is, since the chips are gradually accumulated on the workpiece, a table of the machine tool and the like, as the cutting continues, thermal deformation occurs in the workpiece or the machine tool due to heat of the chips. Thus, working or processing accuracy is deteriorated, and the chips will bite into the insert 3 so that the quality of the cut surface is damaged.

Furthermore, the chips adjacent the insert will enter between sliding surfaces or the like of the machine tool. Thus, it is apprehended that the machine tool per se is deteriorated in accuracy or is reduced in service life.

The above-discussed problems are particularly important in a machining center which requires unmanned operation for a long period of time.

SUMMARY OF THE INVENTION

It is therefore an object of the invention to provide a rotary cutting tool capable of processing chips generated during cutting.

According to the invention, there is provided a rotary cutting tool for use with at least one cutting insert, the rotary cutting tool comprising a cutter body rotatable about a rotational axis and having a forward end, the cutting insert being mounted to an outer periphery of the forward end of the cutter body, and chip moving means arranged outwardly of an outer peripheral surface of the cutter body for removing chips generated by the cutting insert away, the chip moving means including:

cover means for covering the outer peripheral surface of the cutter body having a flow passage defined between an inner peripheral surface of the cover means and the outer peripheral surface of the cutter body; and air sending means arranged within the flow passage for sending air adjacent the cutting insert, toward the outside of the cover means during rotation of the cutter body about the rotational axis.

DESCRIPTION OF THE EMBODIMENTS

Figure 1:
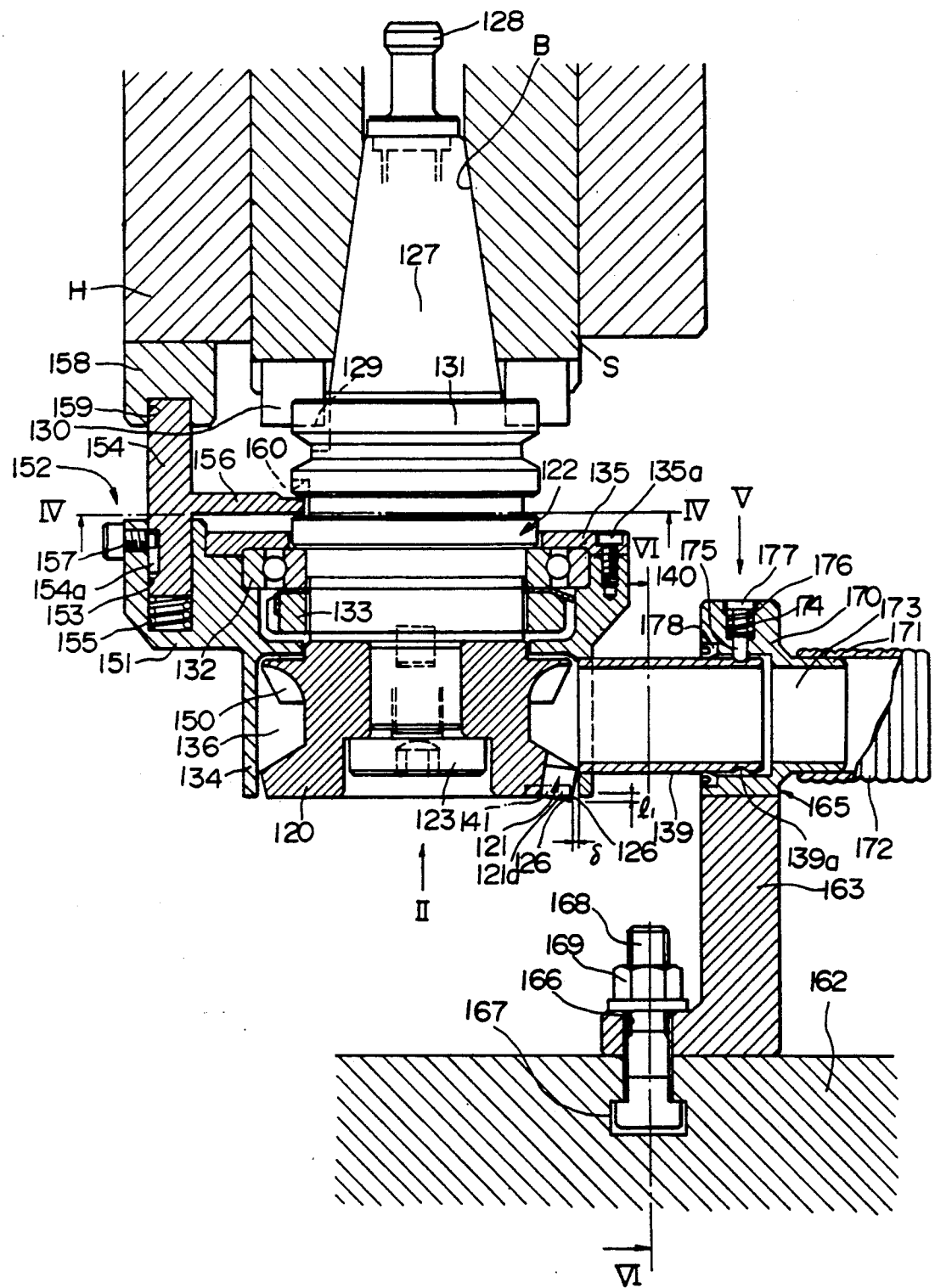
FIG. 1 is a longitudinal cross-sectional view of a rotary cutting tool according to a first embodiment of the invention.

Various embodiments of the invention will be described below with reference to the drawings. It should be noted that like or similar components and parts are designated by the same or like reference numerals throughout the drawings, and the description of the like or similar components and parts will be simplified or omitted to avoid repetition.

First Embodiment

Referring first to FIGS. 1 through 12, there is shown a rotary cutting tool according to a first embodiment of the invention.

Figure 2:
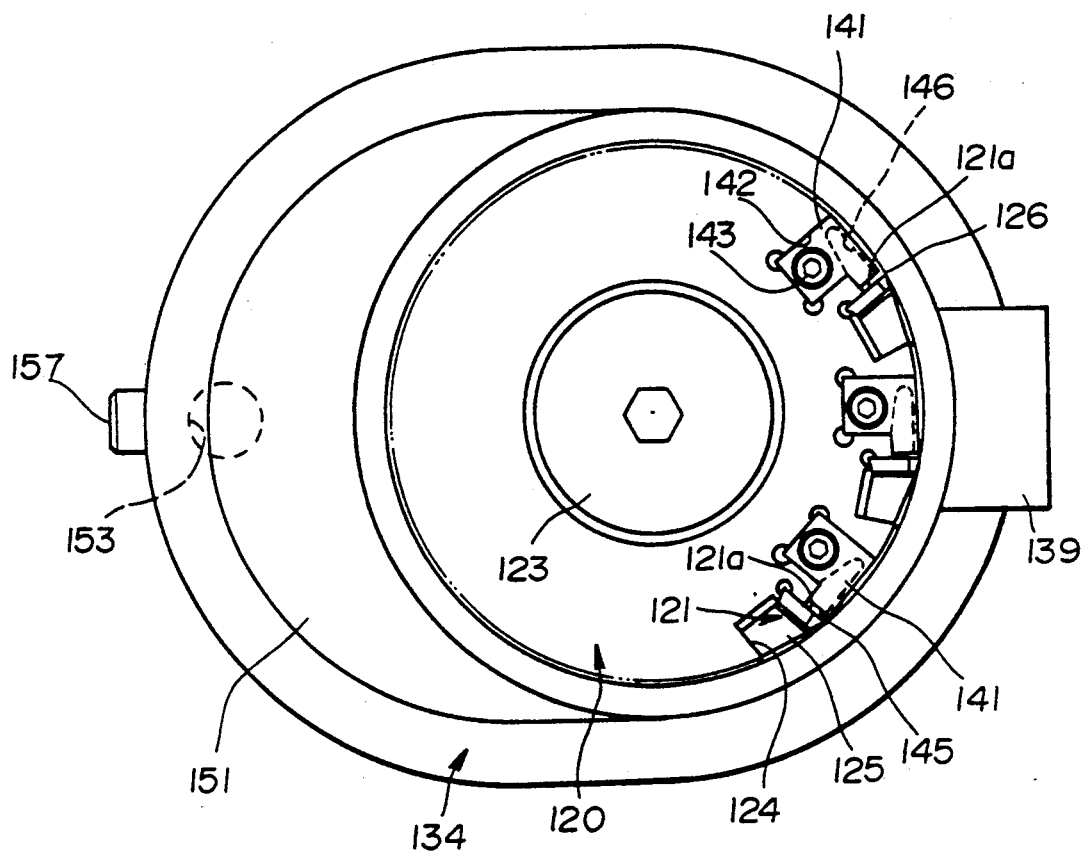
FIG. 2 is a bottom view of the rotary cutting tool illustrated in FIG. 1.
Figure 3:
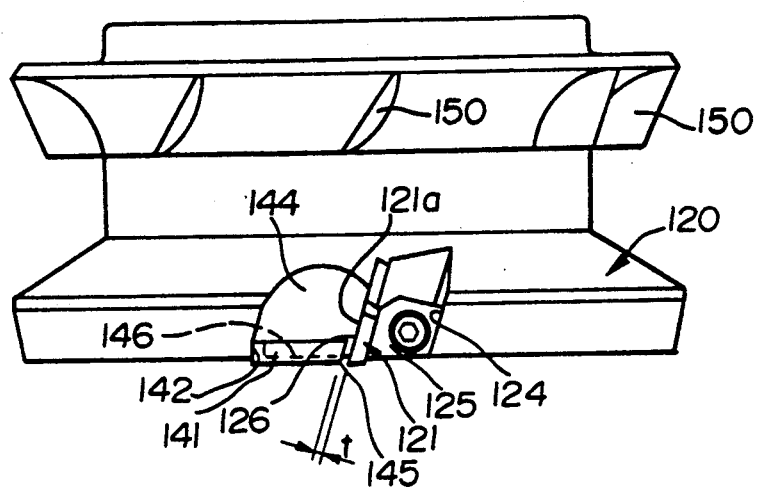
FIG. 3 is a side elevational view of a tool body or a cutter body illustrated in FIGS. 1 and 2.

The rotary cutting tool according to the first embodiment comprises a tool body or a cutter body 120. As shown in FIGS. 1 through 3, one or a plurality of cutting inserts (hereinafter referred to simply as "inserts") 121 are mounted to an outer periphery of a forward end of the cutter body 120, while a connecting means in the form of an arbor 122 is fitted in the proximal end of the cutter body 120 and is connected thereto by a bolt 123 in a coaxial or concentric manner.

Each of the insert 121 is formed by cemented carbide into a square planar plate. The insert 121 is biased or pressed by a wedge element 125 inserted in a recess or groove 124 in the outer periphery of the cutter body 120, and is detachably mounted thereto. The insert 121 has cutting edges 126 which slightly project from the outer periphery and the forward end of the cutter body 120.

On the other hand, the arbor 122 is provided for connecting the cutter body 120 to a main spindle S which is supported by a main spindle head H of a machine tool. The arbor 122 has a pull stud 128 which is pulled toward the rearward end of the main spindle S, that is, upwardly in FIG. 1 under such a condition that a tapered shank 127 is fitted in a tapered bore B in the main spindle S, whereby the arbor 122 is mounted to the main spindle S. The arbor 122 is formed with a plurality of key grooves 129 which are engaged respectively with keys 130 mounted to the main spindle S, by the pulling operation of the pull stud 128. Thus, rotation of the main spindle S is transmitted to the cutter body 120.

A grip 131 is formed on the arbor 122, and is engaged with a tool exchanging arm (not shown) of an automatic tool exchanging apparatus. A radial bearing 132 is fitted about the arbor 122 at a location closer to the forward end of the cutting tool than the grip 131. The bearing 132 has an inner ring which is axially clamped by a nut 133.

A cover assembly 134 is fitted about the outer ring of the radial bearing 132. The cover assembly 134 has its proximal end which is connected, through a plurality of bolts 135a, to a cap 135 fitted about the outer ring of the radial bearing 132. Thus, the cover assembly 134 is restricted in its axial movement, and is rotatably supported by the cutter body 120.

The forward end of the cover assembly 134 is formed into a cylinder which opens toward the forward end of the cutting tool. A distance along the axial direction of the tool 11 between the forward end of the cover assembly 134 and a corner portion of each of the insert 121 is so determined as to be slightly larger than the depth of cut of the cutting edge 126 facing radially outwardly of the cutting tool. The forward end of the cover assembly 134 has its inner diameter which is so determined as to be slightly larger than a rotational locus of the above-mentioned cutting edge 126. A radial gap quantity o between the inner peripheral surface of the cover assembly 134 and the cutting edge 126 is suitably determined in accordance with material of the workpiece, cutting conditions and so on. It is desirable, however, that the radial gap quantity 0 is set within a range of from 0.5 mm to 2 mm. In order to effect more reliable chip processing, it is desirable that the radial gap quantity o is set within a range of from 0.5 mm to 1 mm. If the gap quantity 0 is less than 0.5 mm, there is apprehended that the cutting edge 126 will bite into the cover assembly 134 due to eccentricity thereof. On the other hand, if the gap quantity 0 exceeds 2 mm, a chip suction force subsequently to be described is reduced. Thus, there may occur that the reduction of the chip suction force will interfere with chip processing.

A chip accommodating chamber 136 is defined between the inner peripheral surface of the cover assembly 134 and the outer peripheral surface of the cutter body 120. A circular discharge port 137 is formed in the peripheral wall of the cover assembly 134 and communicates with the outside of the cover assembly 134. A hollow discharge tube 139 is fitted in the discharge port 137. A partition wall 140 is formed on the inner peripheral surface of the cover assembly 134 at a location adjacent an upper portion thereof, for isolating the chip accommodating chamber 136 and the radial bearing 132 from each other.

As shown in detail in FIGS. 2 and 3, a plurality of chip guide elements 141 each in the form of a planar plate are arranged at respective locations where the forward end of the cutter body 120 is directed toward the faces 121a of the respective insert 121. The chip guide elements 141 are fastened respectively to mounting seats 142 of the cutter body 120 and are fixedly mounted thereto by respective bolts 143. Each of the chip guide elements 141 has a surface which is substantially flush with the forward-end face of the cutter body 120.

The outer periphery of each of the chip guide elements 141 is formed into such a configuration as to substantially close a corresponding one of a plurality of insert pockets 144 formed in the cutter body 120. A predetermined gap t is defined between the face 121a of the insert 121 and an end face 145 of the chip guide element 141 facing toward the face 121a, for guiding chips generated by the cutting edge 126, to the chip accommodating chamber 136. The dimension of the gap t is suitably set in accordance with the material of the workpiece, the cutting conditions and so on. It is preferable that the gap t is set within a range of from 0.5 mm to 2.0 mm as far as possible. If the gap quantity t is less than 0.5 mm, clogging of the chips may occur. On the other hand, if the gap quantity t exceeds 2.0 mm, the chip suction force may be reduced so that the chip processing ability is impaired. A groove 146 is formed in the rear side of the chip guide element 141, and extends from the end face 145 toward the wall surface of the chip pocket 144. Thus, consideration is made to prevent the chips passing through the gap t, from being clogged to discharge the chips to the chip pocket 144.

Furthermore, as shown in FIGS. 1 and 3, the air sending means includes a plurality of vanes or blades 150 which are formed on the outer peripheral surface of the cutter body 120. These blades 150 are formed such that the outer periphery of the cutter body 120 is cut at predetermined intervals in the peripheral direction. Each of the blades 150 has its configuration which is so determined as to be gradually inclined toward the rearward side of the cutting tool in the rotational direction thereof as a distance increases from the forward end of the cutting tool toward the proximal end thereof.

As shown in FIG. 1, the proximal end of the cover assembly 134 is formed at 151 into an elliptical configuration bulged laterally of the forward end of the cover assembly 134. A cover restricting mechanism 152 is provided on the elliptical projection 151.

The cover-restricting mechanism 152 is provided for restricting rotation of the cover assembly 134. The cover- restricting mechanism 152 is generally composed of an engaging shaft 154 slidably inserted in a guide bore 153 in the projection 151, a coil spring 155 for biasing the engaging shaft 154 toward the proximal end of the cutting tool in the axial direction, and a stopper 156 extending from the engaging shaft 154 toward the center of the cutting tool in the radial direction.

Figure 4:
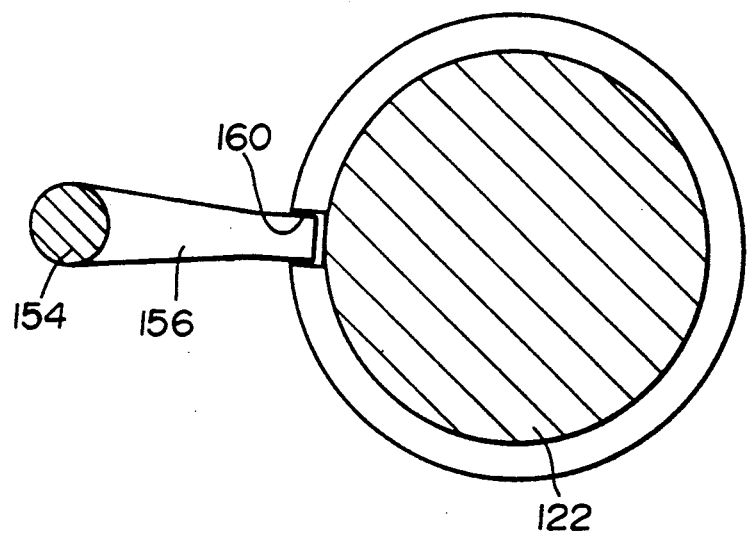
FIG. 4 is a cross-sectional view taken along the line IV-IV in FIG. 1.

The engaging shaft 154 has a key groove 154a which is engaged with a forward end of a screw 157 threadedly engaged with the projection 151 so that angular movement of the engaging shaft 154 about the axis thereof is restricted. Furthermore, the forward end of the engaging shaft 154 is fitted in an engaging bore 159 in an engaging block 158 mounted to the main spindle head H of the machine tool, under such a condition that the arbor 122 is fitted in the main spindle S, so that the engaging shaft 154 can restrict rotation of the cover assembly 134. Moreover, as shown in FIGS. 1 and 4, the stopper 156 extends to a position where the forward end of the stopper 156 reaches an engaging groove 160 formed in the arbor 122. Thus, the stopper 156 can be extended into and retracted from the engaging groove 160 during axial movement of the engaging shaft 154.

Figure 5:
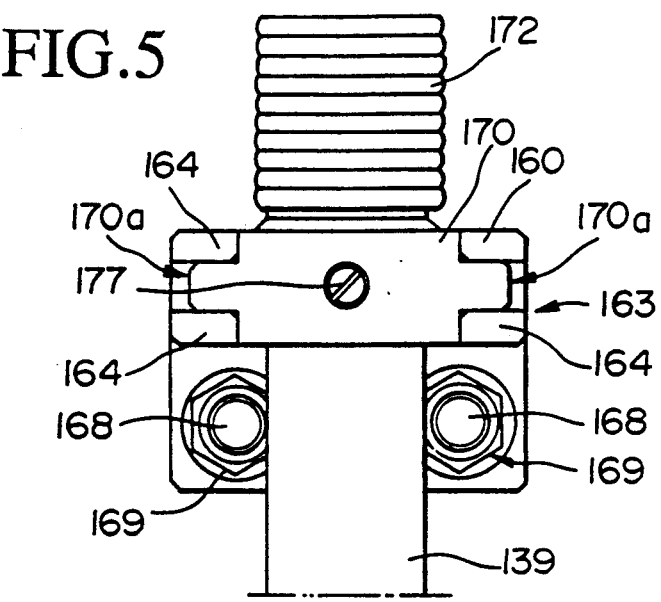
FIG. 5 is a fragmentary plan view taken from the direction V in FIG. 1.
Figure 6:
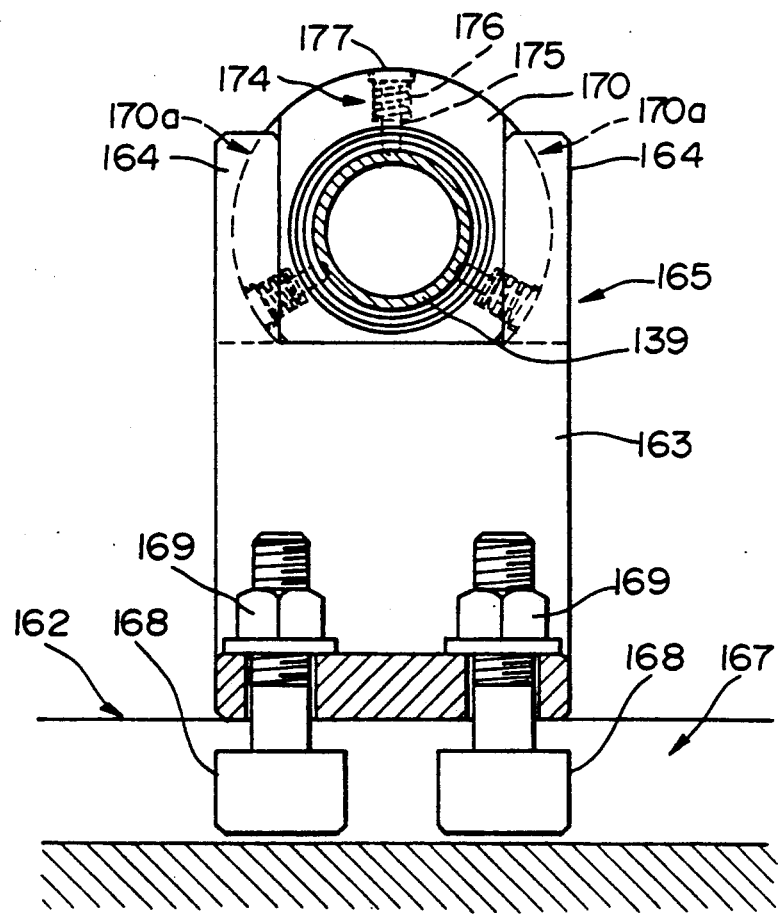
FIG. 6 is a cross-sectional view taken along the line VI—VI in FIG. 1.
Figure 7:
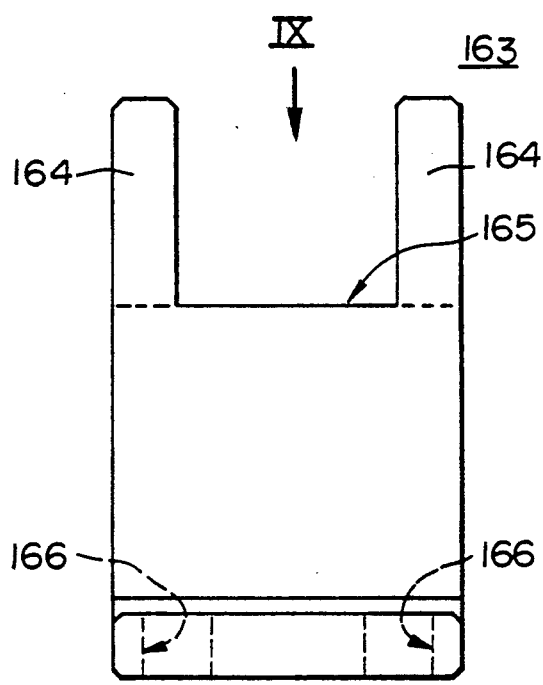
FIG. 7 is an elevational view of a stand illustrated in FIG. 1.
Figure 8:
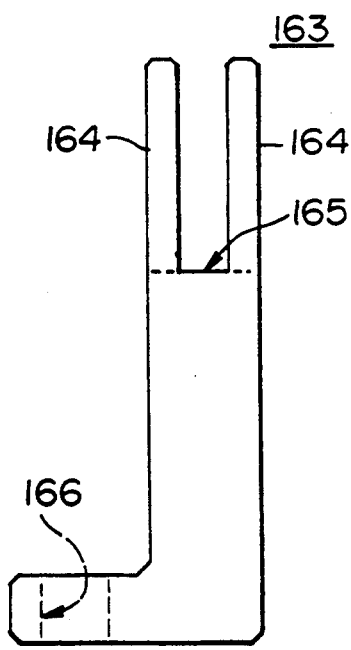
FIG. 8 is a side elevational view of the stand.
Figure 9:
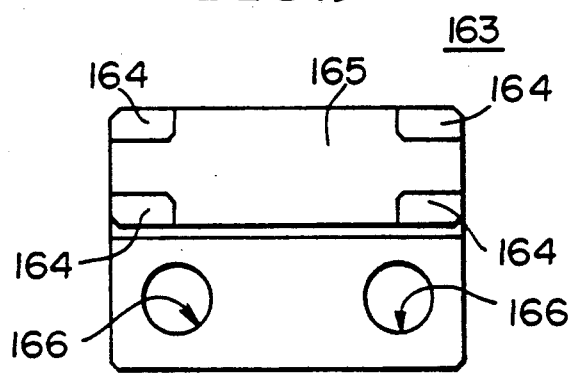
FIG. 9 is a plan view of the stand.

On the other hand, as is shown in FIGS. 1, 5 and 6, on the upper surface of table 162 which functions as a base, a stand 163 is provided. As shown in FIGS. 7 through 9, a mounting seat 165 is formed at the upper portion of this stand 163, comprised of four support posts 164 extending vertically from its uppermost surface. Additionally, T-bolts 168 pass vertically through mounting bolt holes 166 in the base end of the stand 163, the ends of each of which engage below with a T-groove 167 formed in table 162, the opposite ends of each of which are threaded and are thus thereby fastened from above by respective nuts 169. In this way the stand 163 is mounted on the upper surface of table 162 in such a way that its position is changeable.

Figure 10:
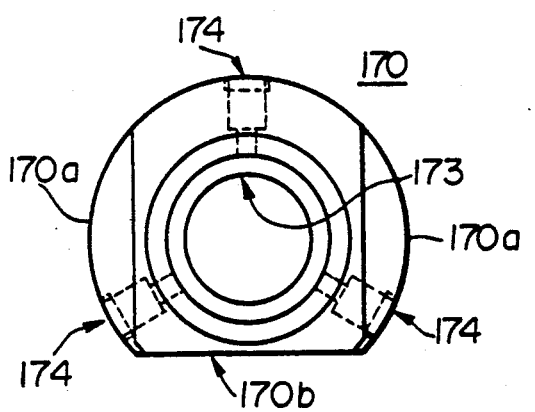
FIG. 10 is an elevational view of a coupling illustrated in FIG. 1.
Figure 11:
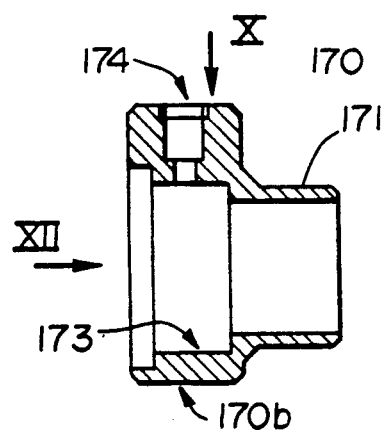
FIG. 11 is a side sectional view of the coupling.
Figure 12:
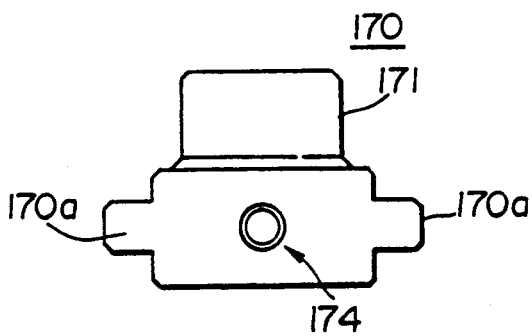
FIG. 12 is a plan view of the coupling.

Furthermore, a coupling 170 is provided in the above mentioned mounting seat 165 of the stand 163 as is shown in FIGS. 10 to 12. A crescent plate shaped engaging portion 170a is formed at each side of the coupling 170. The lower portion 170b of coupling 170 is formed as a horizontal planar surface. Thus, as shown best in FIG. 6, each of the above mentioned engaging portions 170a fits between a respective adjacent pair of the above mentioned four support posts 164 of the stand 163, while the lower portion 170b of coupling 170 rests snuggly against the above mentioned mounting seat 165. In this way, coupling 170 is freely detachably mounted above and in proximity to the surface of table 162 in such a way that the planar surface of its lower portion 170b is horizontal to table 162, and so that it is movable within a plane above and parallel to the surface of table 162.

Also, a cylindrical connecting portion 171 is integrally on an end surface of the coupling 170 to which an exhaust hose 172 is fitted around and thereby connected, the other end of exhaust hose 172 connecting with a chip conveyer or similar type of scrap processing equipment (not shown in the drawings). A connecting passage 173 is thus formed in connecting portion 171 which is continuous with exhaust hose 172 on one side, and extends to the opposite side of coupling 170. Thus, together with coupling 170 and stand 163, exhaust hose 172 is freely detachably mounted above the surface of table 162.

Extending from openings at the outer circumferential surface of coupling 170 to openings at the inner circumferential surface of coupling 170 are three two step holes 174 equally spaced around the circumference of coupling 170 which have a two step internal bore, the larger diameter step being their outermost aspect. As is shown in FIGS. 1 and 6, a respective rod 175 is held in each of the three two step holes 174 by a respective spring 176. Each rod 175 has a spherical tip and a shaft which is encircled by the above mentioned spring 176, the shaft having a diameter which is less than the smaller diameter bore of the two step holes 174. A disk shaped base portion is formed at the end of each rod 175 opposite to the spherical tip, the diameter of which is greater than the smaller diameter bore of the two step holes 174 and less than the larger diameter bore of the two step holes 174. Thus, each rod 175 is spring loaded in a respective two step hole 174, and held therein by a respective stop screw 177. The spherical tip of each rod 175 protrudes somewhat into the internal bore of connecting passage 173, and by virtue of the springs 176, the rods 175 are impelled centrally. As will be described later on, the spherical tips of these rods 175 engage with the V-shaped groove 139a formed in exhaust pipe 139, whereby in the present preferred embodiment, a mechanism is provided to connect exhaust pipe 139 and hose 170.

The operation of the face milling cutter constructed as above will be described below.

The face milling cutter is stored within a magazine attachment (not shown) of the automatic tool exchanging apparatus of the machine tool. The face milling cutter is transported by a tool exchanging arm of the automatic tool exchange apparatus from the magazine attachment, and is mounted to the main spindle S. During the transportation, the engaging shaft 154 is biased by the coil spring 155 toward the proximal end of the cutting tool. Thus, the stopper 156 is engaged with the engaging groove 160 in the arbor 122. Accordingly, under the magazine storing condition and during exchange of the cutting tool, the cover assembly 134 is prevented from being rotated relative to the arbor 122 and is anchored to a predetermined peripheral position with respect to the arbor 122.

Subsequently, the arbor 122 is mounted to the main spindle S, whereby the forward end of the engaging shaft 154 is engaged with the engaging bore 159 in the engaging block 158 which is fixedly mounted to the main spindle head H. Thus, the engaging shaft 154 is pushed or pressed toward the forward end of the cutting tool against the biasing force of the coil spring 155. As a result, the stopper 156 is disengaged from the engaging groove 160 of the arbor 122. By doing so, the arbor 122 and the cover assembly 134 are brought to their rotatable conditions independently of each other. However, the cover assembly 134 is continuously engaged with the engaging block 158 through the engaging shaft 154. Thus, rotation of the cover assembly 134 is restricted.

By restricting the rotation of cover assembly 134 in this way, the orientation of exhaust pipe 139 is also fixed. Further, the end of exhaust hose 172 connected to coupling 170 which is in turn supported on mounting seat 165 of stand 163 over table 162 of the machine tool, is similarly fixed. In this way, through the operation of control equipment provided with the machine tool, main spindle head H of the machine tool is caused to travel so that exhaust pipe 139 moves coaxially with the connecting passage 173 of coupling 170, whereby exhaust pipe 139 is inserted into connecting passage 173.

As exhaust pipe 139 is thus inserted into connecting passage 173, it pushes back the spherical tips of the rods 175 protruding into the connecting passage 173 against the force of each respective spring 176, whereby the rods 175 are pushed back into their respective two step hole 174. As main spindle head H continues to move and exhaust pipe 139 is further inserted into connecting passage 173, the V-shaped groove 139a moves into position with the two step holes 174 whereupon the the rods 175 are pushed by their respective springs 176 so as to engage with the V-shaped groove 139a, whereby exhaust pipe 139 and coupling 170 are connected, thus connecting exhaust pipe 139 with exhaust hose 172. By virtue of seal 178, an airtight connection is achieved. Thus, running from chip accommodating chamber 136, along exhaust pipe 139, passing through coupling 170 into exhaust hose 172 and then to the scrap processing equipment, a tubular conduit is formed.

Then, in this state, main spindle head H moves vertically upward away from table 162, together with coupling 170, which as described before, is free to move upward only. At the point at which the engaging portions 170a of coupling 170 separate form the support posts 164 of stand 163, then main spindle head H is free to move in the horizontal plane. Because the main spindle head H and exhaust hose 172 can now move together freely, they assume a predetermined position on the workpiece, whereby the end of cutter body 120 is caused to oppose the point on the work piece where the milling is to be carried out.

After the arbor 122 has been mounted to the main spindle S, the cutter body 120 is rotated about its axis by the main spindle S, and relative movement in the direction perpendicular to the axis of the cutting tool is given to a location between the main spindle S and the workpiece facing toward the forward end of the cutting tool. During the relative movement, the cutting edges 126 of the insert 121 cut the workpiece.

At the cutting, the blades 150 provided on the outer periphery of the cutter body 120 are rotated together during rotation of the cutter body 120. Thus, air on the side of the forward end of the cutting tool is successively drawn toward the proximal end of the cutting tool. In this manner, air surrounding the cutter body 120 is successively drawn into the chip accommodating chamber 136 through the opening portion at the forward end of the cover assembly 134.

The chips generated along the face 121a of each of the insert 121 by the cutting edge 126 thereof are passed through the gap t between the end face 145 of the chip guide element 141 and the face 121a of the insert 121, and are guided to the chip pocket 144. The chips are rounded off and divided into pieces by the chip pocket 144. The divided chips are drawn into the chip accommodating chamber 136 together with air drawn through the opening at the forward end of the cover assembly 134. Furthermore, the drawn away chips then pass out of chip accommodating chamber 136 through exhaust pipe 139, then through coupling 170 and exhaust hose 172, whereby they are recovered in the scrap processing equipment.

After the milling has thus been carried out, the main spindle head H then retracts to a position in proximity to the surface of table 162 and the coupling 172 is returned to its position on the mounting seat 165 of the stand 163. Through this operation, the engaging portions 170a of coupling 170 are again brought into a position of engagement with the support posts 164. In this state, since coupling 170 is no longer free to move in the horizontal plane above table 162, as main spindle head H continues to retract, exhaust pipe 139 disengages, and then separates from coupling 170, while the coupling, and the exhaust hose 172 connected thereto rest on stand 163 over table 162.

When the cutting tool is removed from the main spindle S after processing has been completed, the cutter body 120 is positioned at its peripheral location which is the same as that at mounting to the main spindle S by the orientation function of the main spindle S, because of engagement between the cutter body 120 and the tool exchanging arm. Accompanied with the positioning, the engaging groove 160 of the arbor 122 is positioned at a location corresponding to the forward end of the stopper 156. The arbor 122 is removed from the main spindle S by the tool exchanging arm and, simultaneously, the engaging shaft 154 is pushed or returned toward the proximal end of the cutting tool in the axial direction by the coil spring 155. Accompanied with the returning, the engaging groove 160 and the stopper 156 are again engaged with each other. In this manner, rotation of the cover assembly 134 relative to the arbor 122 is again restricted by the latter. Thus, play or floating movement of the cover assembly 134 about its axis is prevented when the cutting tool is exchanged or when the magazine attachment accommodating therein the cutting tools is driven, so that, even if the tool exchange is repeated, the peripheral positions of the respective discharge port 137 and discharge tube 139 are always maintained constant. Accordingly, the discharge position of the chips is always maintained constant, and chip processing means such as a chip accommodating box or the like is arranged at a location facing toward the discharge tube 139 on the side of the machine tool, whereby an attempt can be made to easily process the chips on the side of the machine tool in a concentrated manner.

With the rotary cutting tool of the present embodiment as described above, through the operation of the vacuum exhaust mechanism, air and milling scrap at the end of cutter body 120 are drawn into chip accommodating chamber 136, after which they pass through exhaust pipe 149, and from there through coupling 170 and then exhaust hose 172. After passing through exhaust hose 172, the air and chips contained therein are exhausted to scrap processing equipment and gathered and processed therein for recovery. In this way, dispersion of milling debris in the ambient air can be prevented, thus improving the work environment and decreasing the amount of time necessary for scrap processing.

Furthermore, since the chip suction force is generated by the blades 150 formed on the cutter body 120, it is not required to provide a special or particular equipment such as a suction machine for drawing the chips or the like, on the side of the machine tool. Thus, there can be obtained such a functional advantage that the apparatus is made simple in construction and is reduced in cost.

With the rotary cutting tool of the present embodiment, by virtue of the cover-restricting mechanism 152, when removed from main spindle S, cover assembly 134 is anchored at a predetermined peripheral position with respect to the arbor 122, and rotation is restricted with respect to cutting body 120. When the arbor 122 is mounted to the main spindle S, arbor 122 is disengaged from cover assembly 134, and rotation of cover assembly 134 with respect to the cutting body 120, which is engaged with main spindle head H, is restricted. Thus, when the cutter is detached, the cutter and cover assembly 134 are detached as a unit, and when the cutter is mounted on main spindle S, cover assembly 134 does not interfere with the rotation of cutting body 120. Moreover, in situations such as when the cutter is exchanged, coupling 170 can freely be mounted on and removed from the mounting seat 165 on stand 163 over table 162 of the machine tool while connected with exhaust hose 172.

For this reason, with the apparatus of the present invention, when exchanging cutters or when driving the magazine which accommodates the cutters, and such operations, swinging of cover assembly 134 to the periphery, pulling and twisting of exhaust hose 172 does not occur. Similarly, no interference between the various mechanical systems provided therein occurs during ordinary operation. Further, when the cutter is mounted on the main spindle, exhaust pipe 139 is ordinarily aligned in a predesignated position, and exhaust hose 172 is connected with coupling 170 which ordinarily rests in a predetermined orientation on stand 163 over table 162, within the range of motion of main spindle head H. Furthermore, in cutting tool of the present embodiment, at least one of either exhaust pipe 139 or exhaust hose 172 is provided with a connection mechanism such as coupling 170. Thus, by employing a control mechanism whereby when controlled movement of main spindle head H relative to table 162 is effected, connection of exhaust pipe 139 and exhaust hose 172 can be automatically and smoothly achieved.

In addition, in the face milling cutter according to the first embodiment, the cover assembly 134 is anchored to the arbor 122 at the predetermined peripheral position when the face milling cutter is removed from the main spindle S. Further, the cover assembly 134 and the arbor 122 are disengaged from each other, in interlocking relation to mounting of the arbor 122 to the main spindle S. Accordingly, the face milling cutter can be used in a machine tool such as a machining center provided with an automatic tool exchanging apparatus, or the like, without any hindrance. Thus, there can be also obtained remarkable functional advantages in the case where a large quantity of chips is generated and it is impossible for an operator to handle chip processing, such as the case where unmanned processing is done by a machining center for a long period of time.

In connection with the above, the first embodiment has been described particularly as an example of the insert-mounting type face milling cutter in which the insert 121 are mounted to the forward end of the cutter body 120. However, the invention should not be limited to this specific example. The invention is applicable also to a face milling cutter having soldered cutting insert or other various rotary cutting tools. In this case, by standardizing the connection portion between coupling 170 and exhaust pipe 139, the chips formed in all of the milling operations can be simply recovered using exhaust hose 172 and then processed together.

Further, in the first embodiment, the blades 150 are particularly formed integrally with the cutter body 120. However, the invention should not be limited to this specific example. A modification or variation can be made to the first embodiment, as will be described below.

Modification of First Embodiment

Figure 13:
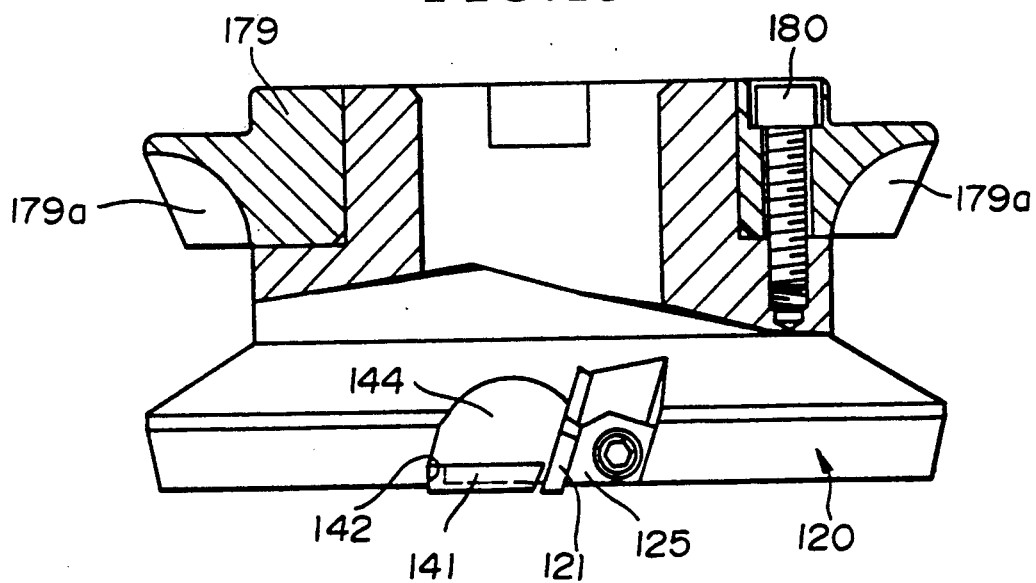
FIG. 13 is a partially broken-away side elevational view of a modification of a blade assembly illustrated in FIGS. 1 through 3.

As shown in FIG. 13, the arrangement may be such that a ring 179 with a plurality of blades 179a manufactured on the outer surface thereof are mounted to the outer periphery of the cutter body 120 and are connected thereto respectively by a plurality of bolts 180 (only one shown).

Further, in the first embodiment, the blades 150 are particularly formed into an axial-flow blade configuration in which the blades 150 are inclined toward the rearward side in the tool rotational direction as the distance increases from the forward end of the cutting tool to the proximal end thereof. However, the invention should not be limited to this specific example. For instance, the same or similar functional advantages can be obtained if the blades are formed into a so-called centrifugal blade configuration in which each of the blades is spiral in plan. It is obvious that other various modifications may be made to the invention.

Furthermore, in the first embodiment, the chip guide elements 141 are particularly provided at the forward end face of the cutter body 120, thereby narrowing the opening of the cover assembly 134. However, the chip guide elements 141 may be dispensed with if a sufficient suction force is produced by the blades 150.

In the following, an example the present embodiment including a variation in the connection between the exhaust pipe and exhaust hose will be described with reference to FIGS. 14 through 23. Elements which are identical to the embodiment shown in FIG. 1 will continue to be identified by the same numerals.

First of all, referring to Figs, 14, 15 and 16, it can be seen that a rectangular groove 181 is formed circumferentially around the inner surface of the connecting passage 173 formed in coupling 170, into which a sealing ring 182 made of rubber or some other pliant material is inserted. An indented groove 183 into which the inner surface of the above mentioned ring 182 fits is formed around the outer surface of the end of exhaust pipe 139 that connects with coupling 170.

The coupler 170 presently under description is simpler compared with the coupler described in the above embodiment, and its manufacture is easier. Additionally, when the sealing ring 182 engages with the groove 183, both the connect of coupling 170 and exhaust pipe 149 as well as an airtight seal between the two is achieved, thereby providing a further improvement.

Figure 17:
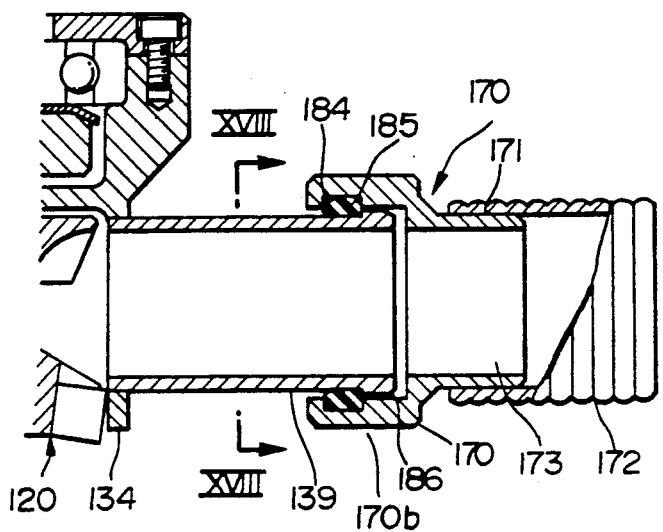
FIG. 17 is a partial cross-sectional view of a cutting tool according to a second modification of a coupling illustrated in FIG. 1.
Figure 18:
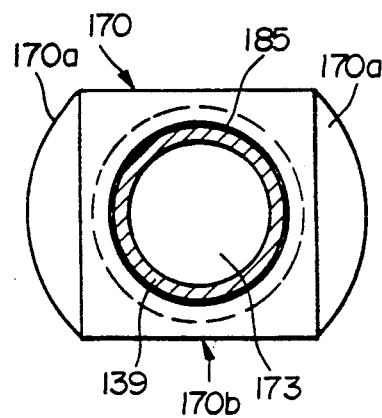
FIG. 18 is a cross-sectional view taken along the line XVIII—XVIII in FIG. 17.

An additional embodiment is shown in FIGS. 17 and 18, wherein just as with the structure described above, a rectangular groove 184 is formed circumferentially around the inner surface of the connecting passage 173 formed in coupling 170, into which a sealing ring 185 made of rubber or some other pliant material is inserted. Rather than the indented groove, an elevated step 186 is formed around the outer surface at the end of exhaust pipe 139, thereby creating a ring having a slightly increased external diameter. When exhaust pipe 139 is inserted into coupling 170, the step 186 is pushed past the above mentioned sealing ring 185, thus forming a connection by holding exhaust pipe 139 in coupling 170, and simultaneously forming an airtight seal.

Figure 19:
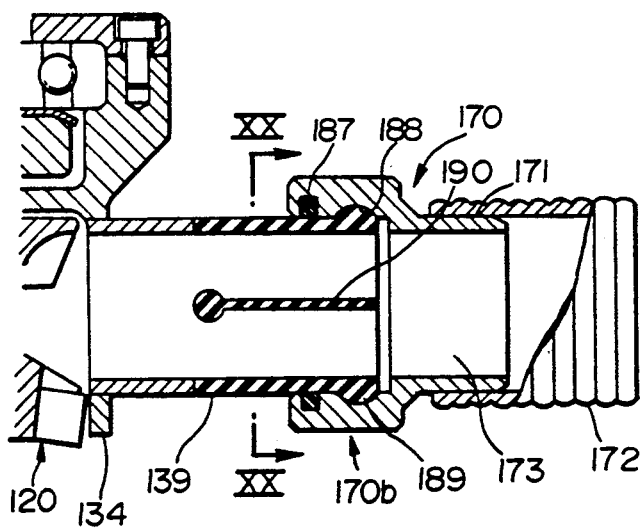
FIG. 19 is a partial cross-sectional view of a rotary cutting tool according to a third modification of a coupling illustrated in FIG. 1.
Figure 20:
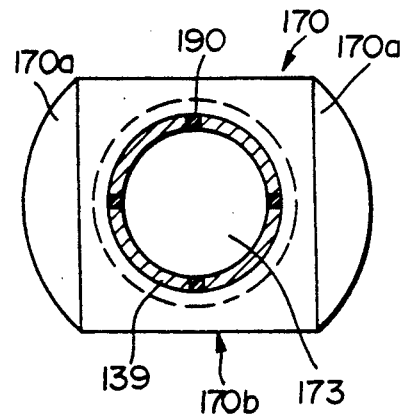
FIG. 20 is a cross-sectional view along the line XX—XX in FIG. 19.

In FIGS. 19 and 20, an other example is shown. In this example, in the proximity of one of the openings of connecting passage 173 formed in coupling 170, an O-ring 187 is fitted into a rectangular groove formed in the circumferential surface of connecting passage 173. Parallel and somewhat proximal to this, a circumferential rounded indentation 188 is formed, into which a corresponding ridge 189 formed at the end of exhaust pipe 139 fits when exhaust pipe 139 is fully inserted into coupling 170. Slots 190 are formed at the end of exhaust pipe 139 parallel to its longitudinal axis, into which rubber, or some similar pliant material is fitted.

In this embodiment, when the end of exhaust pipe 139 is inserted into coupling 170, the presence of the above described slots 190 allows the diameter of the ridge 189 formed at the end exhaust pipe 139 to contract somewhat, after which it springs back to its normal diameter when the exhaust pipe 139 is fully inserted in coupling 170 where the ridge 189 can fit into the corresponding indentation in coupling 170.

Figure 21:
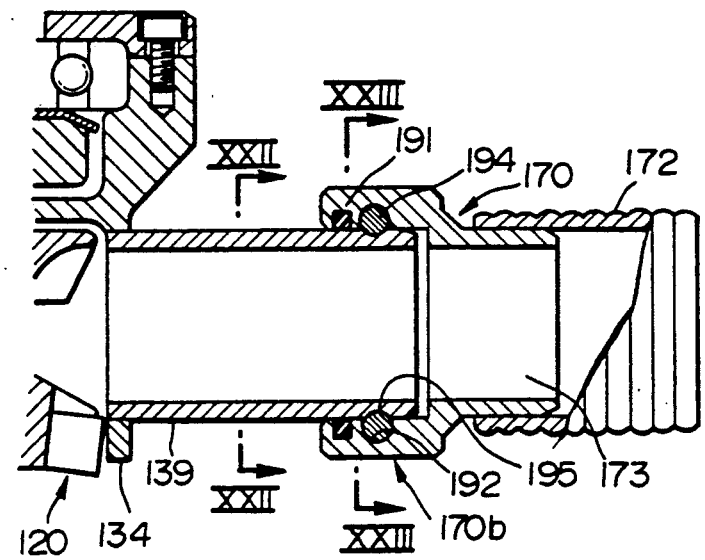
FIG. 21 is a partial cross-sectional view of a rotary cutting tool according to a fourth modification of a coupling illustrated in FIG. 1.
Figure 22:
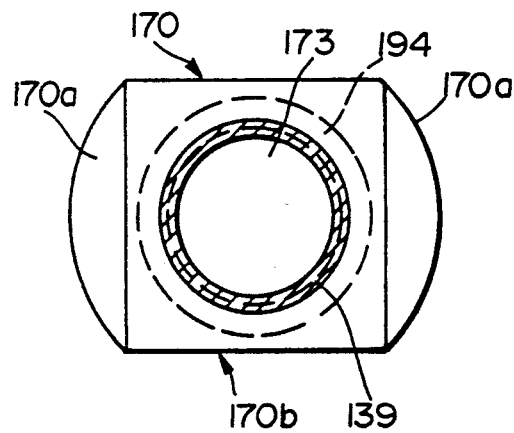
FIG. 22 is a cross-sectional view along the line XXII—XXII in FIG. 21.
Figure 23:
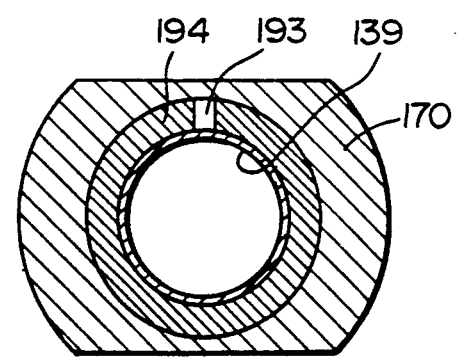
FIG. 23 is a cross-sectional view along the line XXIII—XXIII in FIG. 21.
Figure 24:
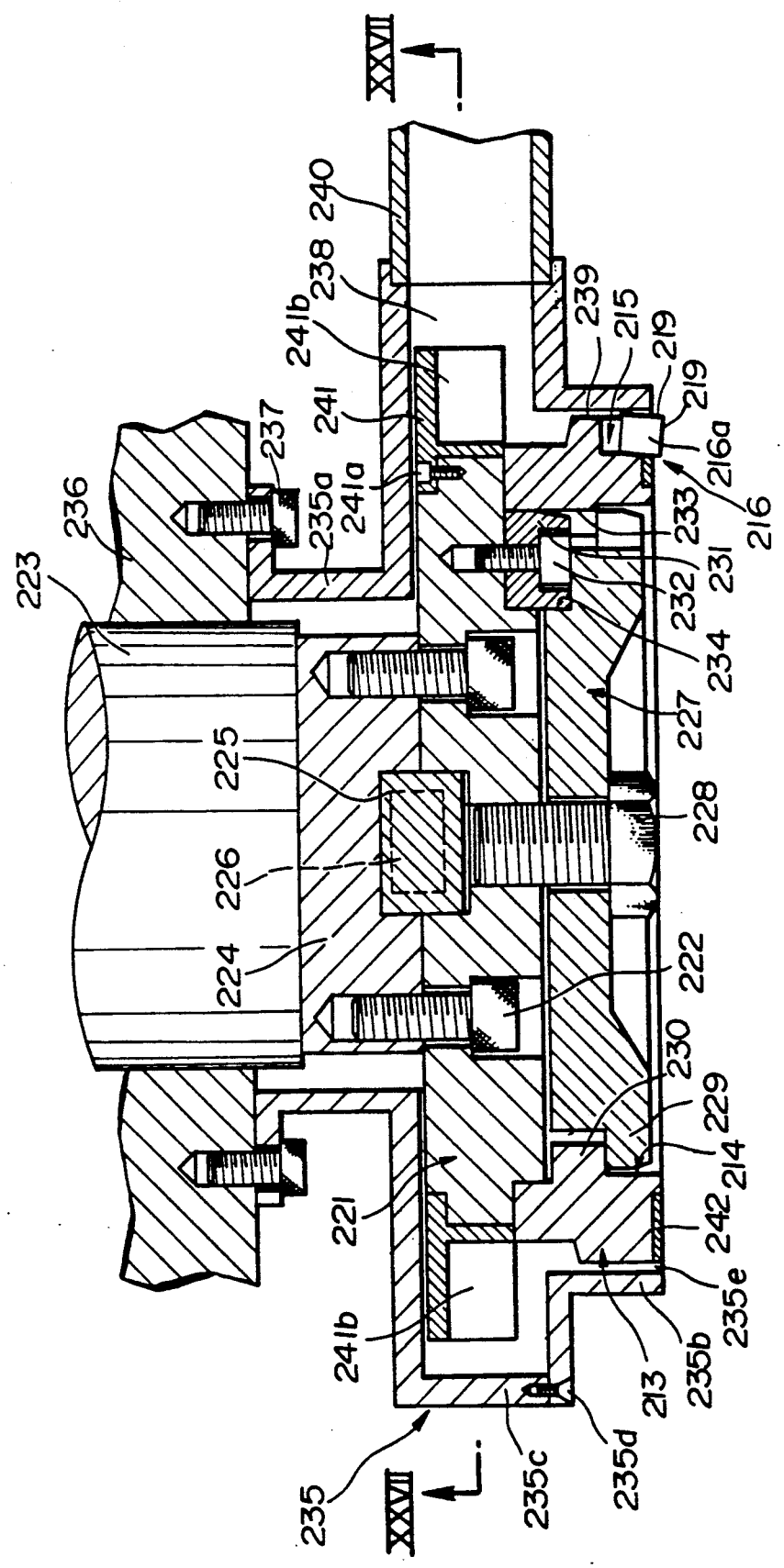
FIG. 24 is a longitudinal cross-sectional view of a rotary cutting tool according to a second embodiment of the invention.
Figure 25:
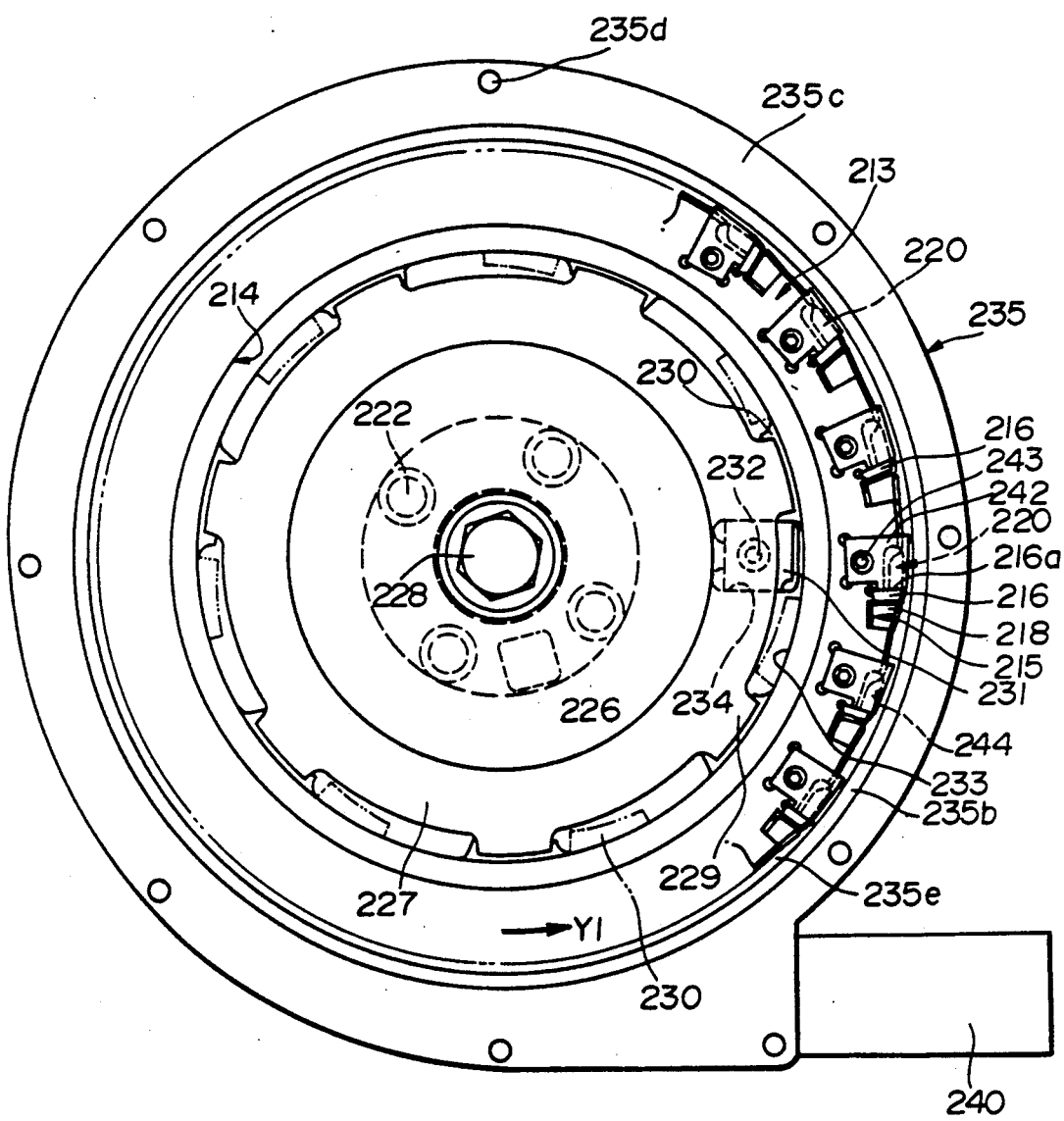
FIG. 25 is a bottom view of the rotary cutting tool illustrated in FIG. 24.
Figure 27:
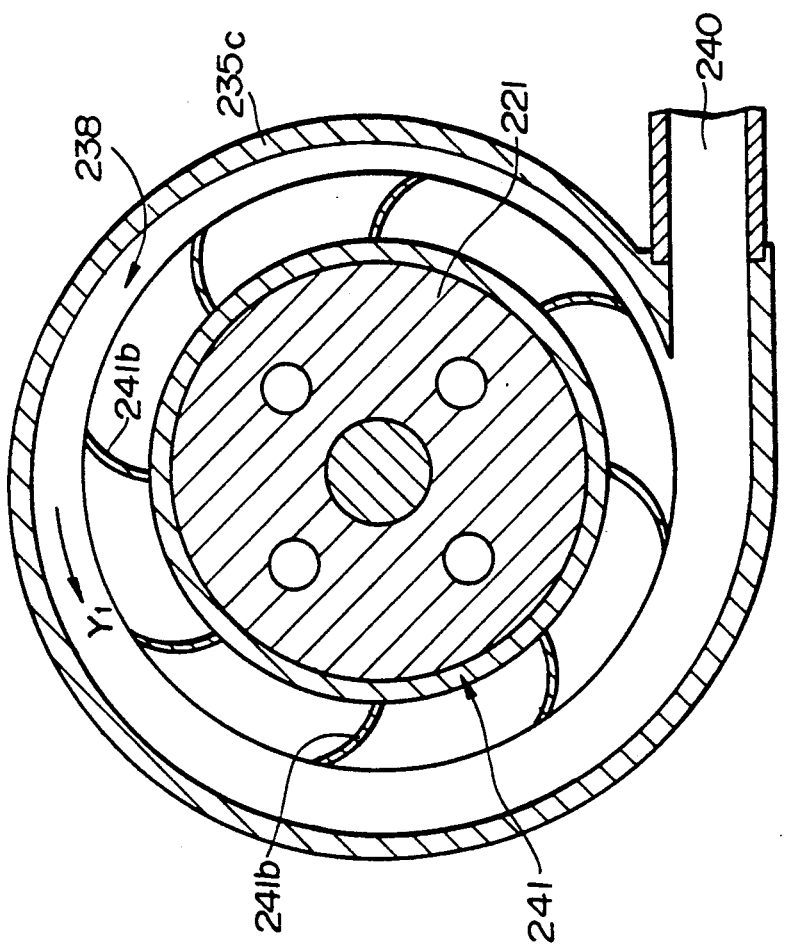
FIG. 27 is a cross-sectional view taken along the line IX—IX in FIG. 24.
Figure 26:
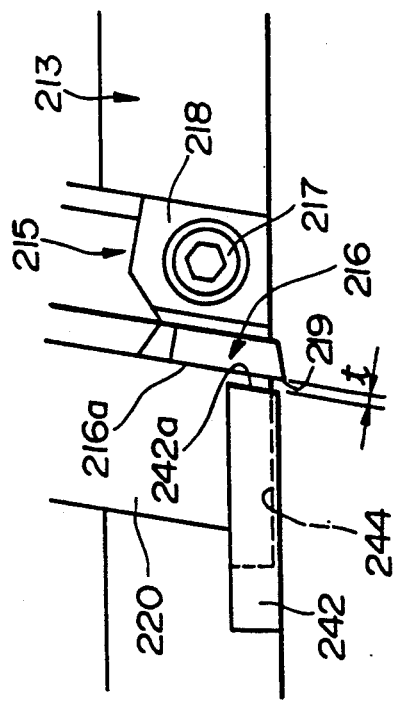
FIG. 26 is a fragmentary enlarged side elevational view of an outer peripheral portion of a cutter body at a forward end thereof, illustrated in FIGS. 24 and 25.
Figure 28:
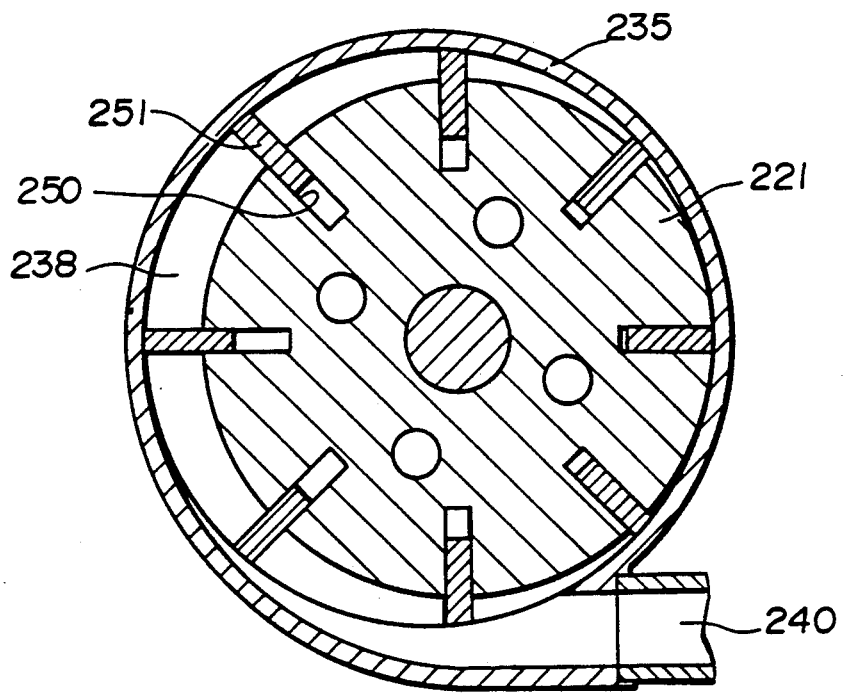
FIG. 28 is a cross-sectional view of an interior of a pump chamber in a first modification of the second embodiment illustrated in FIGS. 24 through 27, taken along a plane perpendicular to an axis of the pump chamber.
Figure 29:
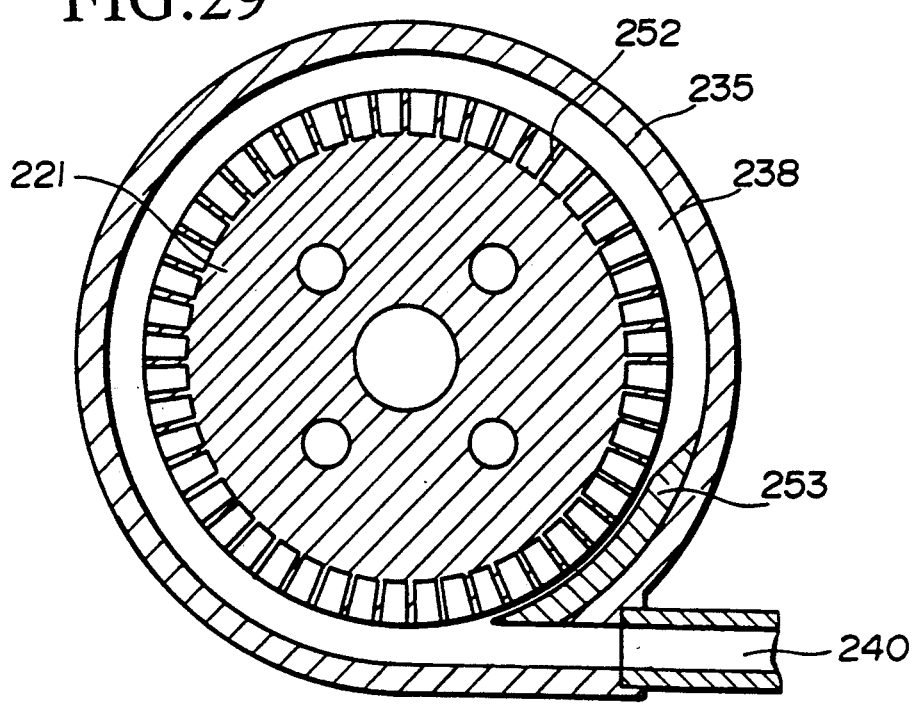
FIG. 29 is a view similar to FIG. 28, but showing a second modification of the second embodiment.
Figure 30:
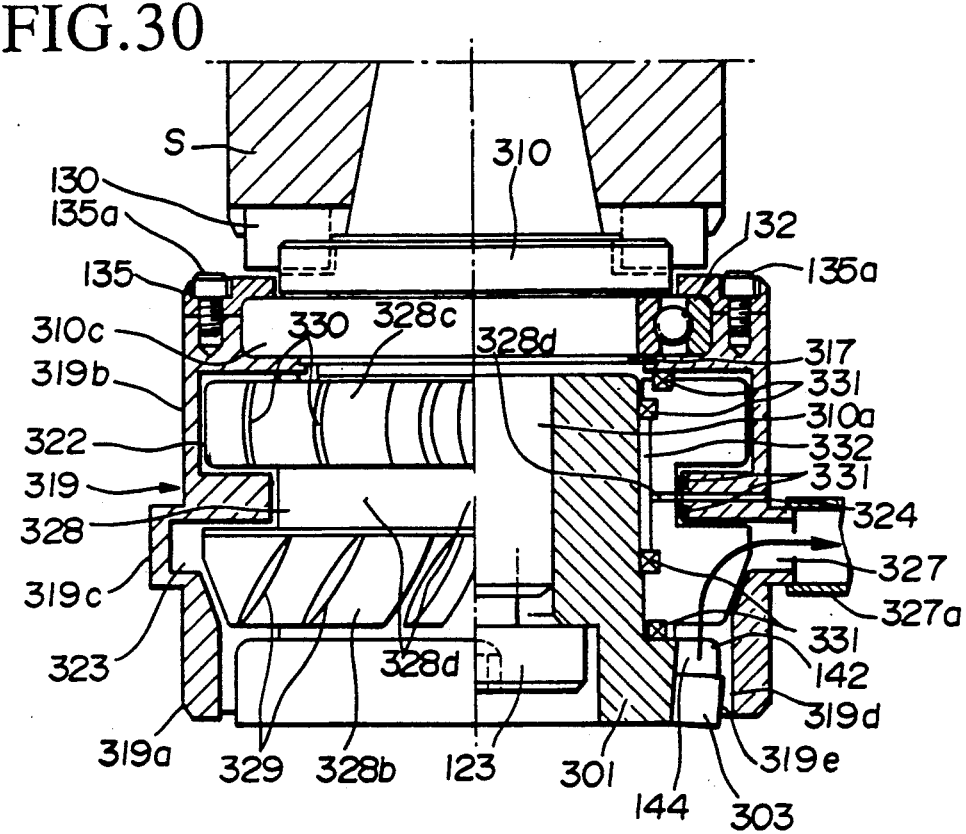
FIG. 30 is a longitudinal cross-sectional view of a rotary cutting tool according to a third embodiment of the invention.
Figure 31:
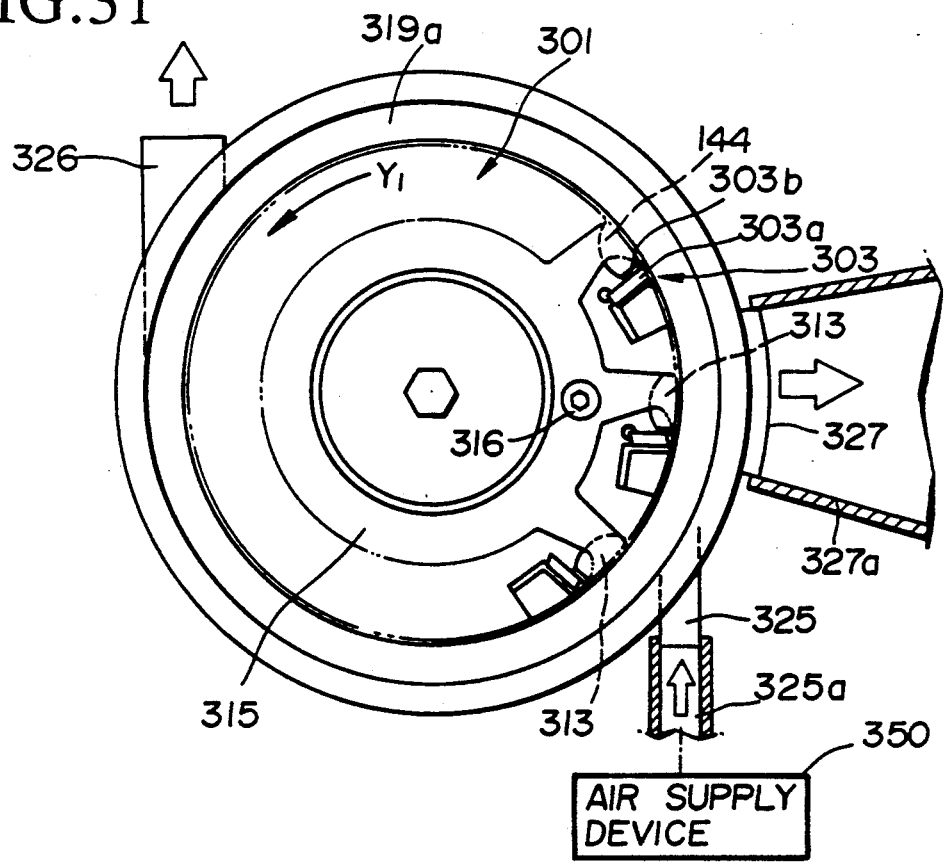
FIG. 31 is a bottom view of the rotary cutting tool illustrated in FIG. 30.
Figure 32:
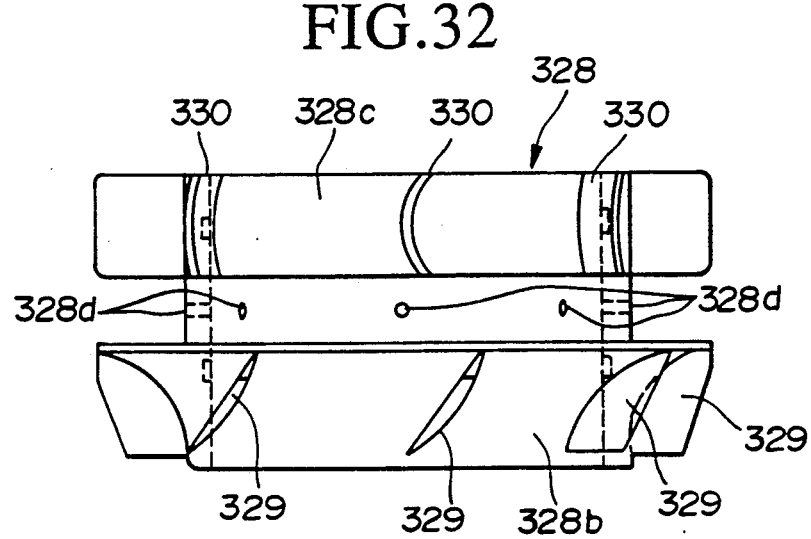
FIG. 32 is a fragmentary enlarged side elevational view of a turbine unit of the cutting tool illustrated in FIGS. 30 and 31.
Figure 35:
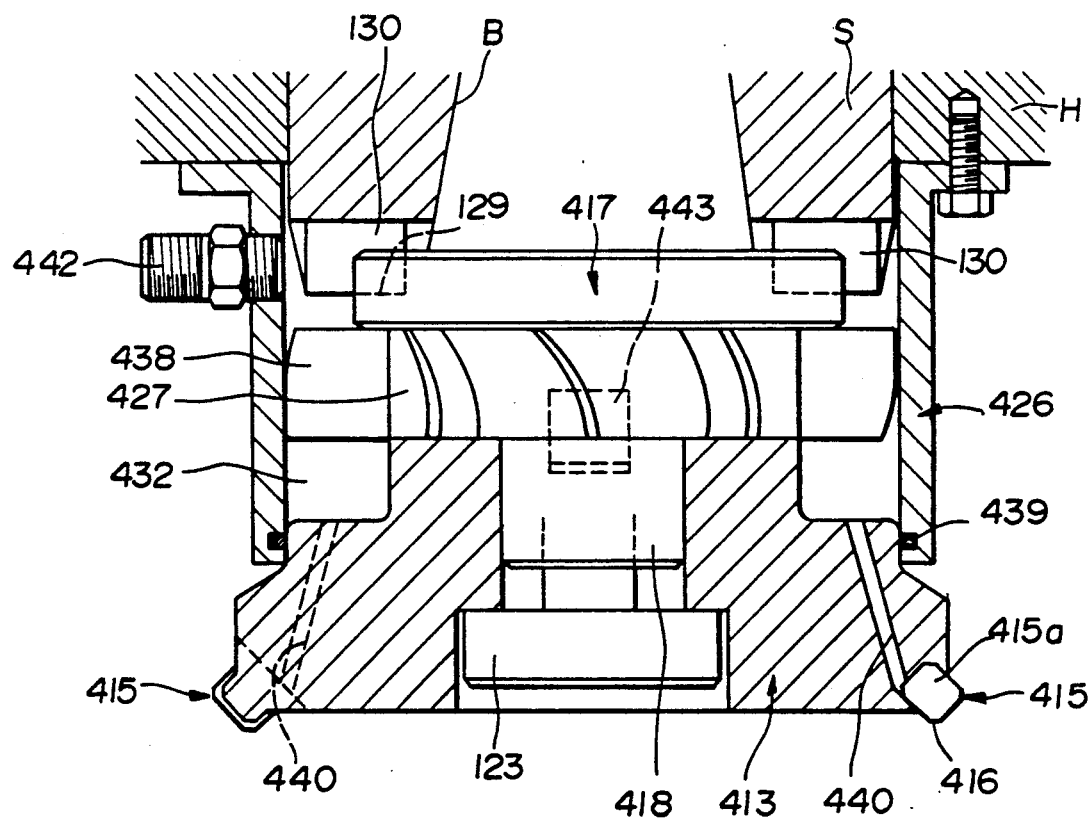
FIG. 35 is a longitudinal cross-sectional view of a rotary cutting tool according to a modification of the fourth embodiment illustrated in FIGS. 33 and 34.
Figure 33:
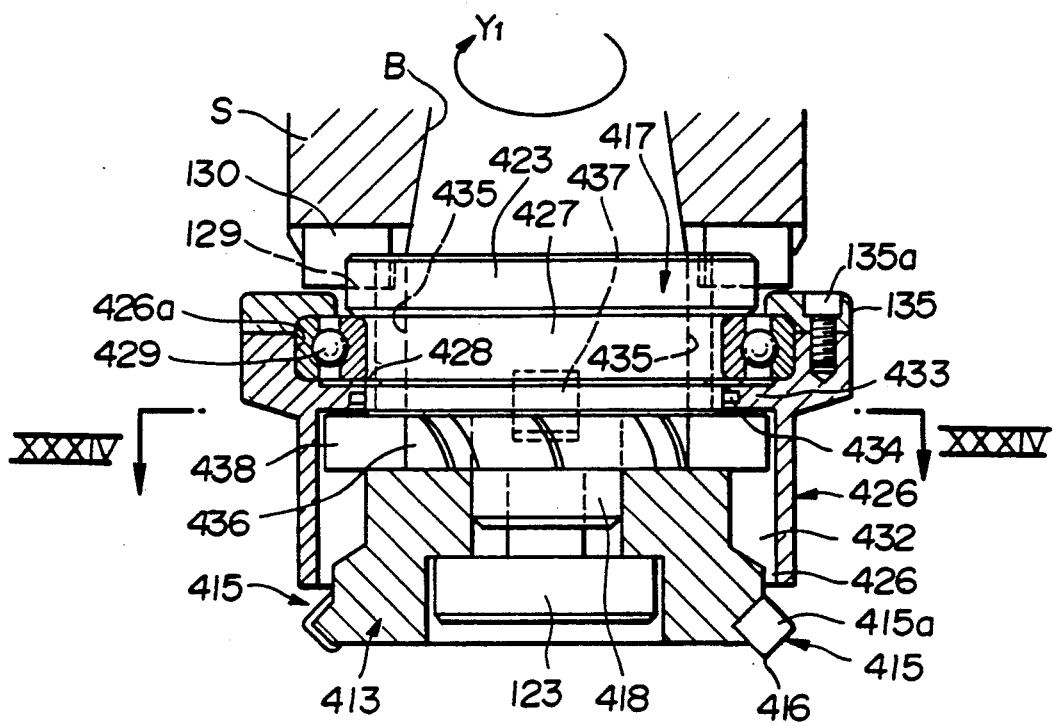
FIG. 33 is a longitudinal cross-sectional view of a rotary cutting tool according to a fourth embodiment of the invention.
Figure 34:
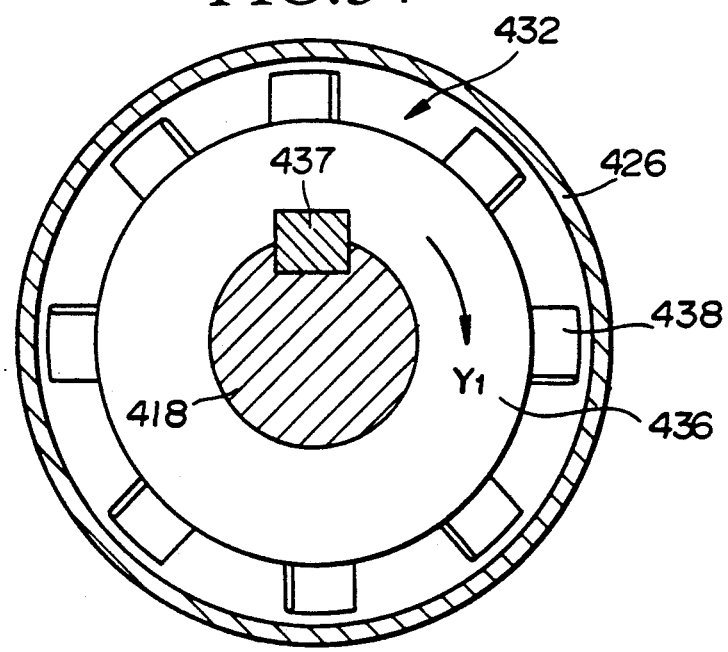
FIG. 34 is a cross-sectional view taken along the line XVI—XVI in FIG. 33.
Figure 36:
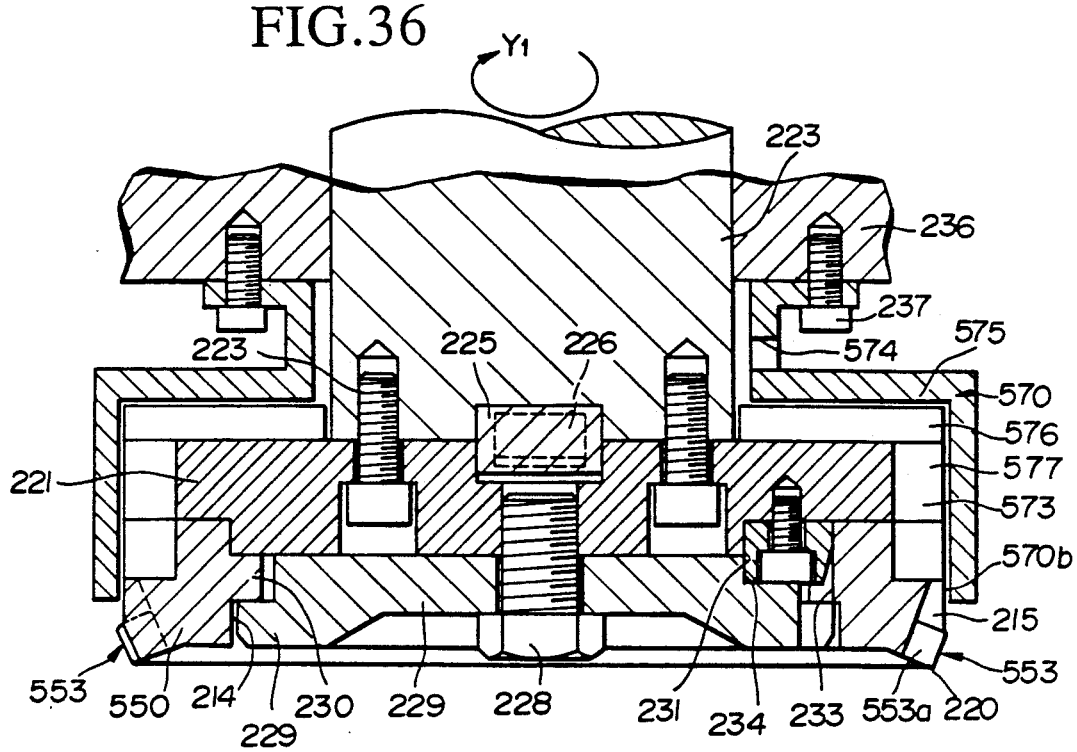
FIG. 36 is a longitudinal cross-sectional view of a rotary cutting tool according to a fifth embodiment of the invention.
Figure 37:
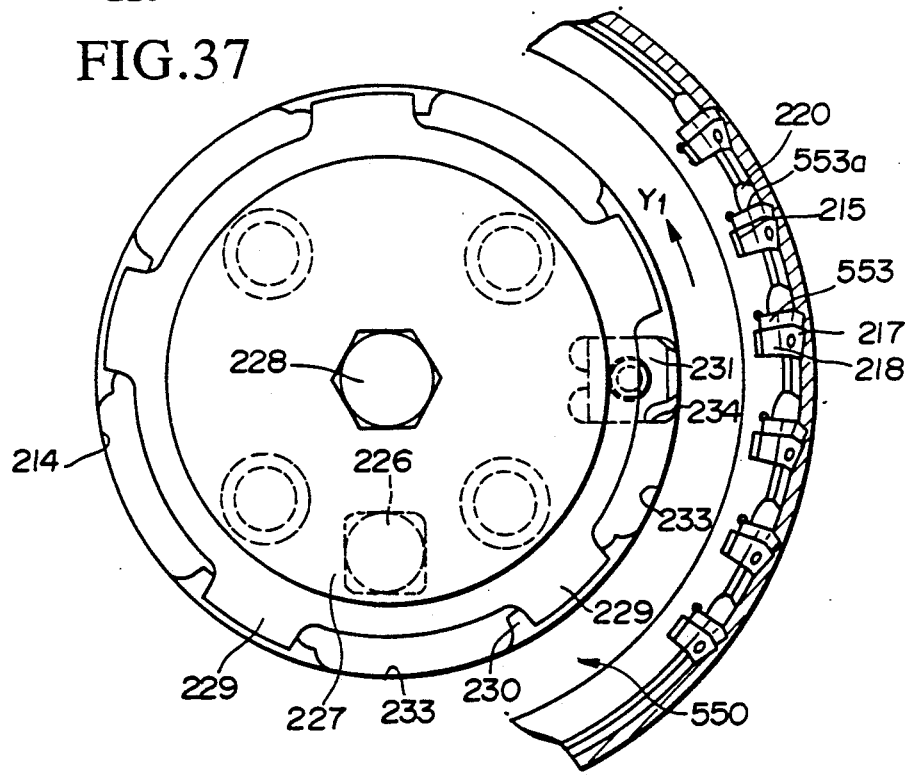
FIG. 37 is a fragmentary bottom view of the rotary cutting tool illustrated in FIG. 36.
Figure 38:
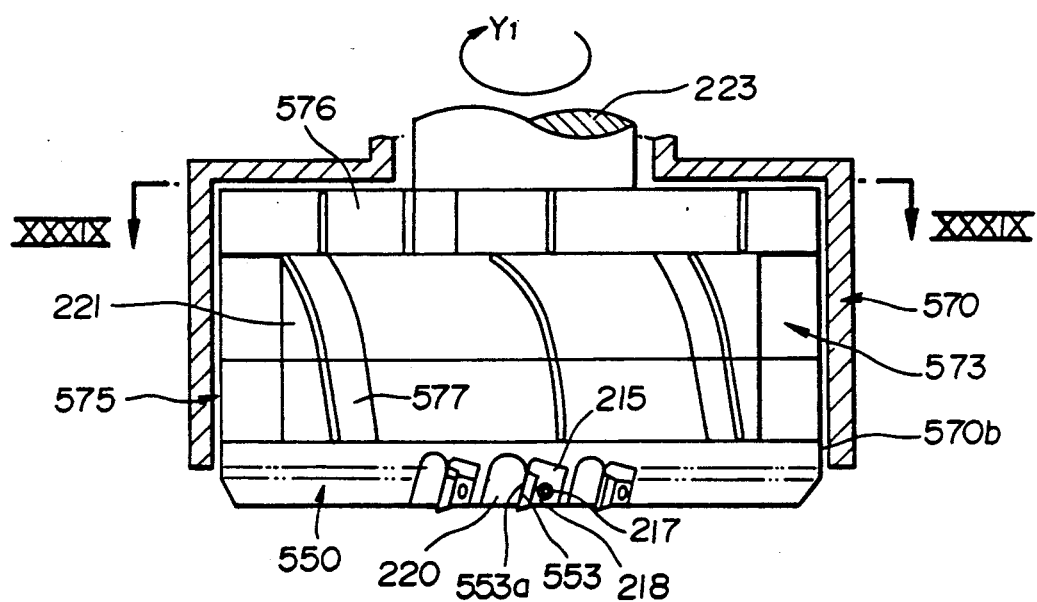
FIG. 38 is a side elevational view of a cutter body illustrated in FIGS. 36 and 37.
Figure 39:
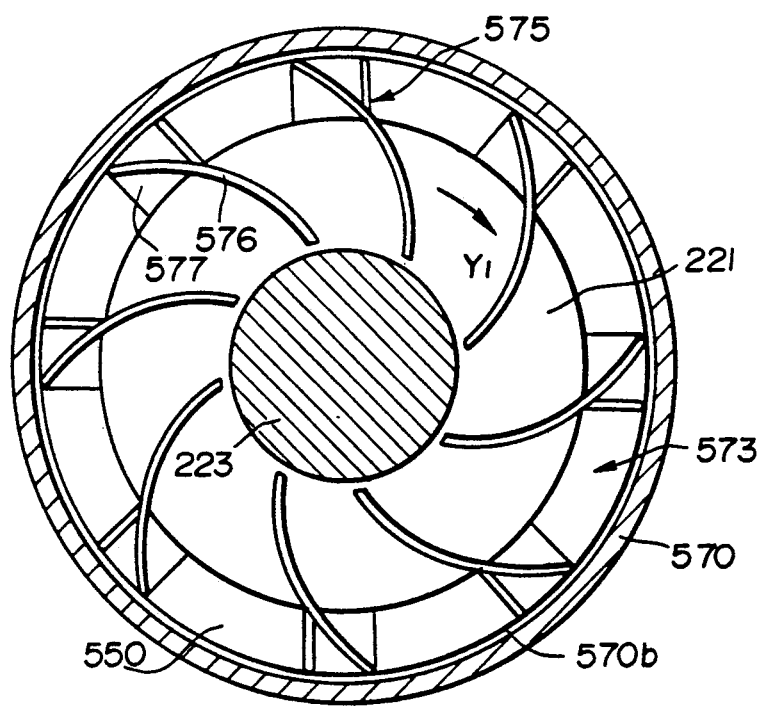
FIG. 39 is a cross-sectional view taken along the line XXI—XXI in FIG. 38.
Figure 40:
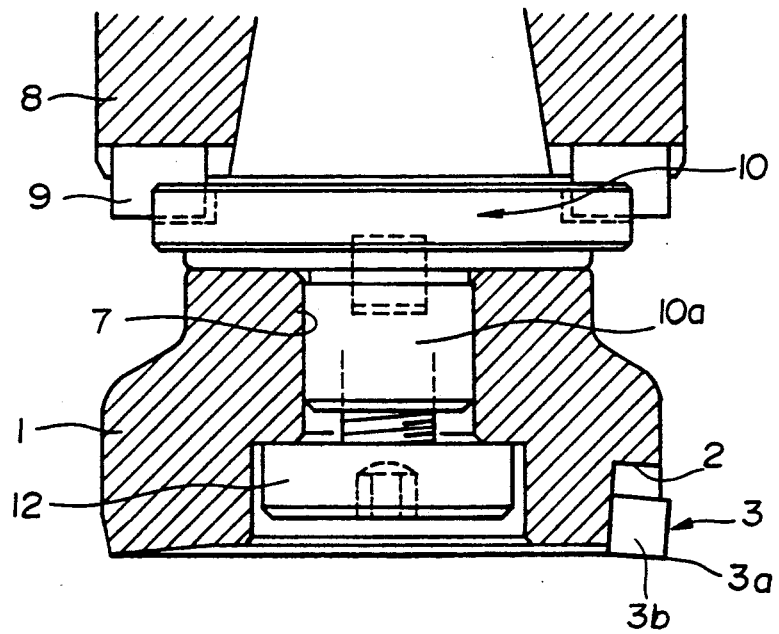
FIG. 40 is a longitudinal cross-sectional view of the conventional rotary cutting tool.
Figure 41:
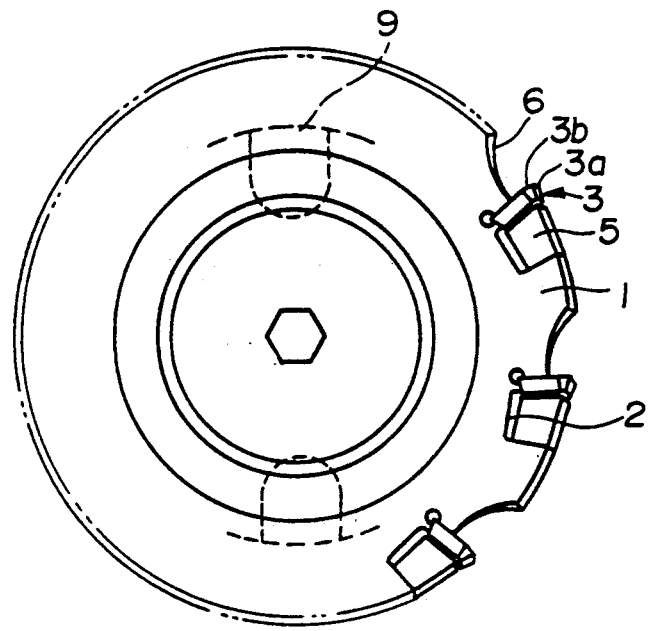
FIG. 41 is a bottom view of the conventional cutting tool illustrated in FIG. 40.
Figure 42:
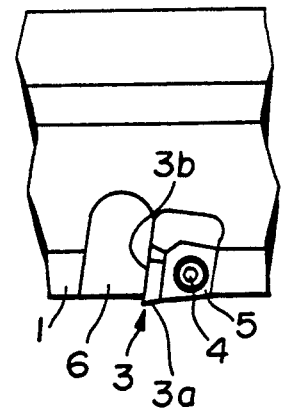
FIG. 42 is a fragmentary enlarged side elevational view showing a forward-end section of the cutting tool illustrated in FIGS. 40 and 41.

Yet another embodiment is shown in FIGS. 21 through 23. In this embodiment, just as in the preceding embodiment, an an O-ring 191 is fitted into a rectangular groove formed in the circumferential surface of connecting passage 173. Additionally, somewhat more proximally, a circumferential rounded groove 192 is formed, into which a plastic or metal C-ring engaging portion 194 of circular cross section is fitted, the C-ring engaging portion 194 having a discontinuity 193 whereby its diameter can be made to increase. A corresponding circumferential rounded indentation is formed near the end of exhaust pipe 139 on its external surface which engages with the above mentioned engaging portion 194, when exhaust pipe 139 is fully inserted into coupling 170.

In the example described immediately above, when the end of exhaust pipe 139 is inserted into coupling 170, the presence of the above described discontinuity 193 allows the diameter of the engaging portion 194 fitted in the groove on the inner surface of connecting passage 173 to expand somewhat, after which it springs back to its normal diameter when the exhaust pipe 139 is fully inserted in coupling 170 where the engaging portion 194 can fit into the corresponding indentation in exhaust pipe 139. Thus, the engaging portion 194 provides a snug connection, while the previously described O-ring 191 provides an airtight seal between exhaust pipe 139 and coupling 170. By using an engaging portion 194 formed of metal or plastic having increased wear resistance compared with rubber, alteration in the dimensions of the connecting portions over time is decreased, hence a snug connection can be provided over a longer lifetime.

In the various embodiments described above, the respective engaging portions were provided on the internal surface of coupling 170. It is also possible to provide these on the outer surface of exhaust pipe 139, with corresponding engaging slots provided on the internal surface of coupling 170.

In the embodiments described above, a connecting apparatus in a form of coupling 170 is provided on the exhaust hose 172. On the contrary, it is also possible to provide the same type of coupling at the end of the exhaust pipe 134, which can be detachably mounted to the mounting seat 165 of the stand 163, and into which the end part of the exhaust hose 172 is detachably inserted.

Second Embodiment

Referring next to FIGS. 6 through 9, there is shown a rotary cutting tool according to a second embodiment of the invention.

As shown in FIGS. 6 through 8, the rotary cutting tool comprises a cutter body 213 which is generally in the form of a cylinder formed, at a center thereof, with a central bore 214 extending axially through the cutter body 213. The cutter body 213 has its forward end whose larger-diameter section has an outer periphery formed with a plurality of grooves 215 spaced peripherally in equidistant relation. Similarly to the first embodiment described with reference to FIGS. 1 through 3, one or a plurality of insert 216 is detachably mounted respectively to the grooves 215 by respective wedge elements 218 which are tightened respectively by clamp screws 217. Each of the insert 216 has a ridgeline at which a cutting edge 219 is formed. The cutting edge 219 slightly projects from the forward end face of the cutter body 213. Further, similarly also to the first embodiment described previously, a plurality of chip pockets 220 is formed at respective locations on the forward end of the cutter body 213, which faces toward faces 216a of the respective insert 216.

The cutter body 213 has its proximal end which is fitted about an adapter 221. The adapter 221 is detachably mounted to a main spindle 223 of a machine body by a plurality of bolts 222 through a spacer 224. A center plug 225 and a key 226 are interposed between the proximal-end face of the adapter 221 and a forward-end face of the spacer 224. The center plug 225 is provided for centering the adapter 221 with respect to the main spindle 223, and the key 226 is provided for transmitting rotation of the main spindle 223 to the adapter 221.

A tightening washer 227 is detachably mounted to the forward end of the adapter 221 through a connecting bolt 228. A plurality of projections 229, which extend radially outwardly, are formed on a peripheral surface of the tightening washer 227 in equidistantly spaced relation to each other in the circumferential direction. A plurality of smaller-diameter projections 230, which are the same in number as the projections 229, are formed also on the inner peripheral surface of the central bore 214 in the cutter body 213. The smaller-diameter projections 230 and the projections 229 are engaged with each other, whereby the cutter body 213 is restricted against axial movement and is connected to the adapter 221.

A key 231 is mounted to the forward-end face of the adapter 221 through a bolt 232. When the adapter 221 is connected to the cutter body 213, the key 231 is fitted, in a floatingly movable manner in the peripheral direction, in a cut-out 233 which is contiguous to one of the smaller-diameter projections 230. Under such a condition that the projections 229 and the smaller-diameter projections 230 are engaged with each other, the key 231 is engaged with the wall surface of the cut-out 233 on the leading side in the cutter rotating direction, i.e., in a direction Y1 in FIG. 7. In this manner, rotation of the adapter 221 can be transmitted to the cutter body 213. Further, the key 231 is also engaged with a key groove 234 which is formed in the rear side or face of the tightening washer 227. Thus, rotation of the adapter 221 is transmitted also to the tightening washer 227.

As shown in FIGS. 6 and 7, a tube or cover assembly 235 is arranged outwardly of the peripheral surface of the cutter body 213, for covering the latter. The cover assembly 235 has its proximal-end section 235a which is connected, in a gas-tight manner, to a front face of a main spindle head 236 rotatably supporting the main spindle 223, by means of a plurality of bolts 237. The cover assembly 235 has its forward-end section 235b which extends to a location covering the upper portions of the respective chip pockets 220 formed in the peripheral surface of the cutter body 213 at the forward end thereof. A slight gap is left between the inner peripheral surface of the forward-end section 235b and the peripheral surface of the cutter body 213 at the forward end thereof. The gap is set to a value within a range of from 0.5 mm to 2 mm, preferably, within a range of from 0.5 mm to 1 mm, for the reasons discussed previously with reference to the gap quantity shown in FIG. 1. The forward-end section 235b of the cover assembly 235 is connected to an intermediate section 235c by a plurality of screws 235d.

The intermediate section 235c of the cover assembly 235 is enlarged in diameter more than the forward-end section 235b. A pump chamber 238 is defined between an inner peripheral surface of the intermediate section 235c and the peripheral surface of the adapter 221 which is contiguous to the peripheral surface of the cutter body 213 adjacent the proximal end thereof. The pump chamber 238 is bulged radially outwardly of the cutter body 213. The pump chamber 238 has it inner periphery which communicates with an annular opening 235e of the cover assembly 235 adjacent the forward end thereof, through an annular suction passage 239 formed between the forward end 235b of the cover assembly 235 and the peripheral surface of the cutter body 213 at the forward end thereof. A discharge port element 240 in the form of a tube is fitted in the peripheral surface of the intermediate section 235c of the cover assembly 235. Thus, the pump chamber 238 communicates with the outside through the discharge port element 240.

Furthermore, as shown in FIG. 9, the intermediate section 235c of the cover assembly 235 has its inner peripheral surface which is formed into a volute or spiral configuration gradually bulged radially outwardly of the cutting tool as the distance approaches the discharge port element 240 along the rotational direction of the cutter body 213, i.e., in the direction of Y1 in FIG. 9. Thus, the pump chamber 238 has its cross-sectional area which gradually increases as the distance approaches the discharge port element 240 along the rotational direction of the cutter body 213.

As shown in FIGS. 6 and 9, a ring 241 is detachably mounted to the peripheral surface of the adapter 221 at a location within the pump chamber 238 by a plurality of bolts 241a (only one shown). Eight (8) blades 241b are formed on a peripheral edge of the ring 241 in equidistantly spaced relation to each other in the circumferential direction of the cutting tool. Each of the blades 241b is formed into a spiral blade configuration gradually curved toward the trailing side in the rotational direction of the cutting tool, i.e., the direction Y1 in FIG. 9 as the distance approaches a point radially outwardly of the cutting tool. A gap between end faces of the respective blades 241b on the outside thereof and the inner peripheral surface of the intermediate section 235c of the cover assembly 235 is so determined that a slight clearance is left therebetween at a location where the pump chamber 238 becomes narrowest, i.e., at a location adjacent a point on the leading side in the rotational direction of the cutting tool with respect to the discharge port element 240.

As shown in FIGS. 6 through 8, a plurality of chip guide elements 242, each in the form of a planar plate are mounted through respective bolts 243 respectively to locations at the forward end of the cutter body 213, which face toward the faces 216a of the respective insert 216. The chip guide elements 242 are positioned axially of the cutting tool such that their respective surfaces are substantially flush with the forward-end face of the cutter body 213. Each of the chip guide elements 242 is positioned peripherally of the cutting tool such that the gap t, through which chips generated by the cutting edge 219 of the insert 216 are permitted to pass, is left between the face 216a of the insert 216 and an end face 242a of the chip guide element 242, which faces toward the face 216a of the insert 216.

A plurality of grooves 244 are formed respectively at the rear sides or .aces of the chip guide elements 242. Each of the grooves 244 opens toward the end face 242a and the chip pocket 220. Thus, the chips are guided along the gap t between the end face 242a and the insert face 216a, toward the chip pocket 220 without clogging.

The face milling cutter constructed as described above is used to practice face cutting in the following manner. That is, the adapter 221 is first connected to the main spindle 223 by the bolts 222, and the intermediate section 235c of the cover assembly 235 is fixedly mounted to the front face of the main spindle head 236. At this time, the forward-end section 235b of the cover assembly 235 is removed or detached from the intermediate section 235c.

Subsequently, as indicated by the double dotted lines in FIG. 7, the cutter body 213 is pressed toward the adapter 221 with the cut-out 233 in the cutter body 213 facing toward one of the projections 229 on the tightening washer 227, to fit the proximal end of the cutter body 213 about the adapter 221. Then, the cutter body 213 is moved angularly about the axis of the cutting tool in the direction opposite to the rotational direction of the cutting tool, i.e., in the direction opposite to the direction Y1 in FIG. 7, until the smaller-diameter projections 230 on the cutter body 213 are engaged respectively with the projections 229 on the tightening washer 227. Subsequently, the connecting bolt 228 is tightened. By doing so, the cutter body 213 is clamped between the adapter 221 and the tightening washer 227 and is prevented from being moved axially. Rotation of the cutter body 213 is also restricted by the key 231 fitted in the cut-out 233, so that the cutter body 213 is connected to the main spindle 223.

As described above, mounting operation of the cutter body 213 to the main spindle 223 has been completed. Subsequently, the forward end section 235b of the cover assembly 235 is connected to the intermediate section 235c by the screws 235d, to cover the peripheral surface of the cutter body 213. Then, the cutter body 213 is rotated about its axis in the direction Y1 in FIG. 7 and is fed in the direction perpendicular to the axis, whereby a workpiece is cut by the cutting edges 219 of the respective insert 216.

At this time, chips generated along the face 216a of each of the insert 216 are introduced into the gap t between the end face 242a of the chip guide element 242 and the face 216a of the insert 216 and are discharged into the chip pocket 220.

On the other hand, air on the inner periphery of the pump chamber 238 is urged against the blades 241b during rotation of the cutter body 213 and is pushed out toward the leading side of the rotational direction of the cutting tool. Simultaneously, however, a centrifugal force directed radially outwardly of the cutter body 213 acts upon the air. As a result, the air on the inner peripheral side of the pump chamber 238 is successively guided toward the outer periphery of the pump chamber 238 along the blades 241b.

The air, which is fed toward the outer periphery of the pump chamber 238, is guided to the discharge port element 240 along the inner peripheral surface of the intermediate section 235c of the cover assembly 235, and is discharged through the discharge port element 240. As a result, vacuum or negative pressure occurs on the inner peripheral side of the pump chamber 238 so that air in the vicinity of the insert 216 is successively drawn through the opening 235e of the cover assembly 235 at the forward end thereof, which communicates with the inner peripheral side of the pump chamber 238 through the suction passage 239.

When the negative pressure occurs on the inner peripheral side of the pump chamber 238, the chips guided by each of the chip guide elements 242 and discharged to the chip pocket 220 are drawn toward the inner periphery of the pump chamber 238 together with the air. The drawn chips are successively guided toward the outer periphery of the pump chamber 238 together with the air, and are discharged through the discharge port element 240.

In this case, the amount of air guided toward the discharge port element 240 along the outer periphery of the pump chamber 238 gradually increases as the distance approaches the discharge port element 240, because the air is drawn through the entire periphery of the opening 235e at the forward end of the cover assembly 235. Since, however, the cross-sectional area of the pump chamber 238 is enlarged toward the discharge port element 240, the increase in the amount of air causes back pressure to occur at a location in the vicinity of the discharge port element 240 within the pump chamber 238 so that no effect or influence is exerted upon the drawing or suction efficiency of the air from the inner peripheral side of the pump chamber 238.

When it is necessary to replace the inserts 216 by other new ones during cutting, the connecting bolt 228 is loosened and, then, only the cutter body 213 is moved angularly in the direction Y1 in FIG. 7, to disengage the projections 229 on the tightening washer 227 respectively from the smaller-diameter projections 230 on the cutter body 213. Subsequently, the cutter body 213 is removed from the interior of the forward-end section 235b of the cover assembly 235. The insert 216 are removed from the cutter body 213 and are replaced by other new ones. Subsequently, the cutter body 213 is again engaged with the tightening washer 227 and is connected to the adapter 221.

As described above, according to the face milling cutter of the second embodiment, the chips generated during cutting are successively guided to the chip pockets 220 by the respective chip guide elements 242. The chips are drawn into the interior of the pump chamber 238 by the suction force generated by rotation of the blades 241b and are discharged through the discharge port element 240. Accordingly, it is possible to collect the generated chips through the discharge port element 240 without scattering the chips to the circumference of the machine tool. Thus, the operational environment is considerably improved, and the period of time required for chip processing is considerably shortened. Since the chips are not accumulated on the workpiece, the table of the machine body and the like, deterioration in processing accuracy does not occur due to thermal deformation of the workpiece and the machine tool, and deterioration in quality of a cut surface also does not occur due to biting of the chips into the workpiece and the machine tool. Moreover, the chips do not invade sliding surfaces of the machine body and the like so that reduction in the accuracy of the machine body and reduction of the service life can be prevented.

Moreover, in the second embodiment, only operation of the connecting bolt 228, under such a condition that the tightening washer 227 and the cutter body 213 are engaged with each other, enables the cutter body 213 to be mounted to or demounted from the adapter 221. Further, it is unnecessary for an operator to grip the cutter body 213 when the connecting bolt 228 is operated. Accordingly, in spite of the fact that the cutter body 213 is covered by the forward-end section 235b of the cover assembly 235 so that it is difficult to grip the cutter body 213, the operability of the cutter displacement operation is wholly not impaired.

In connection with the above, in the second embodiment, the cover assembly 235 is fixedly mounted to the main spindle head 236, whereby the cover assembly 235 is restricted with respect to rotation of the cutter body 213 to enable the chips to be collected from the discharge port element 240. However, the invention should not be limited to this specific form. For instance, the chips can be collected by such an arrangement that the cover assembly 235 is rotatably supported by the adapter 221, and the discharge port element 240 is fitted in a hose or the like, to restrict rotation of the cover assembly 235. In short, the cover assembly 235 should rotatably be provided relatively to the cutter body 213.

Further, in the second embodiment, the centrifugal force generated due to rotation of the blades 241b causes negative pressure to occur on the inner peripheral side of the pump chamber 238 to generate a suction force. Accordingly, the strength of the suction force depends largely upon the swinging or revolving diameter of the blades 241b, that is, upon the peripheral speed of the blades 241b on the outer peripheral side thereof. Accordingly, it is desirable that, in design of the blades 241b, the swinging or revolving diameter of the blades 241b is as large as possible within a permissible range.

Furthermore, in the second embodiment, the chip guide elements 242 are particularly arranged at the forward end of the cutter body 213. However, the chip guide elements 242 may be dispensed with if a suction force sufficient to completely collect the chips is produced by the blades 241b, or if chips like dust or dirt such as chips of cast iron or the like are generated.

In the second embodiment, each of the blades 241b is formed into a spiral or volute blade configuration to form the interior of the pump chamber 238 into a configuration of a volute pump. The cutting tool according to the invention should not be limited to this specific form. That is, the blades 241b should utilize the centrifugal force generated during rotation of the cutter body 213 to generate the suction force. Thus, various changes and modifications can be made to the blades 241b, as will be described below.

First Modification of Second Embodiment

As shown in FIG. 10, a plurality of blades 251 each in the form of a planar plate are slidably fitted respectively in a plurality of grooves 250 which are formed in the peripheral surface of the adapter 221 in equidistantly spaced relation to each other in the circumferential direction. Further, the inner peripheral surface of the cover assembly 235 is formed into a true circle. The cover assembly 235 is arranged in eccentric relation to the adapter 221. Thus, the interior of the pump chamber 238 is formed into a configuration of a vane pump. In this case, the centrifugal force generated during rotation of the cutter body 213 pushes the blades 251 radially outwardly of the cutting tool. For this reason, the end face of each of the blades 251 is always in intimate or close contact with the inner peripheral surface of the cover assembly 235, so that it is ensured that air drawn toward the inner periphery of the pump chamber 238 is guided to the discharge port element 240.

Second Modification of Second Embodiment

As shown in FIG. 11, a plurality of vanes or blades 252 extending straight radially outwardly of the cutting tool are formed in the peripheral surface of the adapter 221, and are arranged along the peripheral surface thereof. The inner peripheral surface of the cover assembly 235 is formed into a true circle. Thus, the interior of the pump chamber 238 is formed into a configuration of a regenerative pump. In this connection, in this case, in order to prevent air guided along the inner peripheral surface of the cover assembly 235 from flowing upstream of the pump chamber 238 beyond the discharge port element 240, a reverse-flow preventing plate or element 253 is arranged at a location on the inner peripheral surface of the cover assembly 235 at a location adjacent the discharge port element 240, for narrowing the gap between the end faces of the respective blades 252 and the inner peripheral surface of the cover assembly 235.

Third Embodiment

Figure 14:
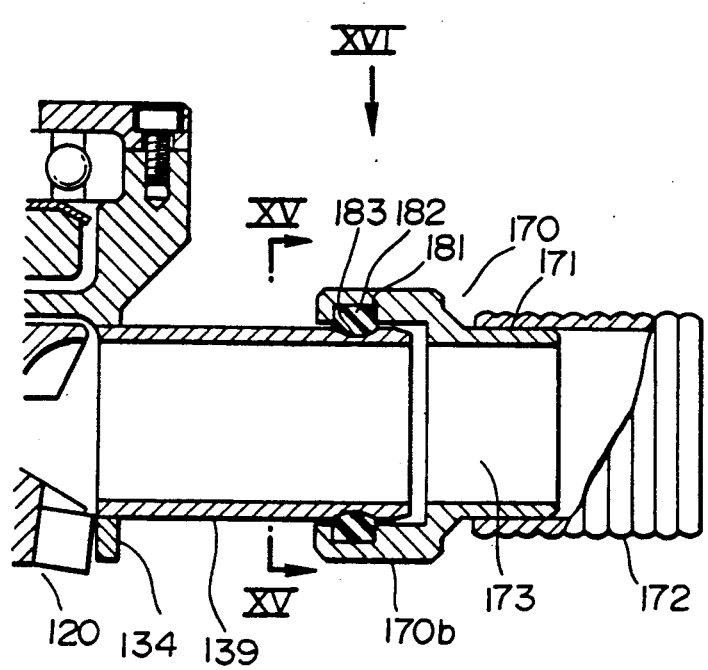
FIG. 14 is a partial cross-sectional view of a rotary cutting tool according to a modification of a coupling illustrated in FIG. 1.

Referring next to FIGS. 12 through 14, there is shown a rotary cutting tool according to a third embodiment of the invention.

The rotary cutting tool according to the third embodiment is different from those according to the first and second embodiments described previously in that a single chip guide element 315 is embedded in a forward end face of a cutter body 301, for discharging chips generated by front cutting edges 303a and outer peripheral cutting edges 303b of respective insert 303, such that a front side or face of the chip guide element 315 is slightly moved backward axially from the front cutting edges 303a. The chip guide element 315 is fixedly mounted to the forward end face of the cutter body 301 by means of a plurality of countersunk screws 316. The chip guide element 315 has a plurality of legs which are associated respectively with the insert 303.

An arbor 310 has a larger-diameter section 310c at a rearward end of a shaft section 310a of the arbor 310. The bearing 132 is fixedly mounted to the larger-diameter section 310c by a retainer ring 317. A tube or cover assembly 319 is fitted about an outer ring of the bearing 132. The cap 135 is fitted about the outer ring of the bearing 132 from a direction opposite to the cover assembly 319. The cap 135 is connected together to the cover assembly 319 by means of the bolts 135a. Thus, the cover assembly 319 is rotatable about the axis of the cutter body 301 with respect thereto.

A drive chamber 322 is defined between the inner peripheral surface of a proximal-end section 319b of the cover assembly 319 and the outer peripheral surface of the cutter body 301 adjacent the proximal end thereof. A section chamber 323 is defined between the inner peripheral surface of a central section 319c of the cover assembly 319 and the peripheral surface of the central portion of the cutter body 301. A plurality of bearing bores 324 are formed between a portion of the cover assembly 319 between the drive chamber 322 and the suction chamber 323 in equidistantly spaced relation to each other in the peripheral direction. The bearing bores 324 extend through the cover assembly 319 in the direction perpendicular to the axis of the cutting tool.

A tube-like air supply port 325 is formed in the outer peripheral surface of the cover assembly 319 adjacent the drive chamber 322. On the other hand, an air discharge port 326 is formed in the outer peripheral surface of the cover assembly 319 at a location symmetrical to the air supply port 325 with respect to the axis of the cutter body 301. By the air supply and discharge ports 325 and 326, the drive chamber 322 communicates with the outside of the cutting tool. The air supply port 325 is connected, through a hose 325a, to an air supply device 350 for supplying air.

The suction chamber 323, which is positioned at a location adjacent the forward end of the cover assembly 319 with respect to the drive chamber 322, communicates with an opening 319e at a forward-end section 319a of the cover assembly 319 through a suction passage 319d which is defined between the forward-end section 319a of the cover assembly 319 and the peripheral surface of the cutter body 301 at the forward end thereof. A chip discharge port 327 is formed in the outer peripheral surface of the suction chamber 323. Thus, the suction chamber 323 communicates with the outside of the cutting tool through the chip discharge port 327. The chip discharge port 327 is connected to a chip bucket 327a for accommodating therein chips blown out.

A turbine unit 328 is rotatably inserted in the drive chamber 322 and the suction chamber 323 which are defined within the cover assembly 319, at a location adjacent the proximal end of the cutter body 301.

The turbine unit 328 is generally in the form of a hollow cylinder. As shown in FIG. 14, the turbine unit 328 has its forward-end section 328b which is formed into such a configuration that the forward-end section 328b is gradually curved toward the axis of the turbine unit 328 as a distance approaches the forward end of the turbine unit 328 from the proximal end thereof. A plurality of suction blades 329 are fixedly mounted to the forward-end section 328b of the turbine unit 328 in equidistantly spaced relation to each other in such a spiral or volute vane configuration that the suction blades 329 are gradually curved toward the trailing side in the rotational direction of the cutting tool as the distance approaches a point radially outwardly of the turbine unit 328. Further, a plurality of drive blades 330 are fixedly mounted to a proximal-end section 328c of the turbine unit 328 in equidistantly spaced relation to each other and in parallel relation to the axis of the turbine unit 328 in such a manner that central sections of the respective drive blades 330 are curved rearwardly in the rotational direction of the cutting tool.

The turbine unit 328 having the suction blades 329 and the drive blades 330 is inserted in a space between the cutter body 301 and the cover assembly 319 at a location between the proximal end and the forward end of the cutter body 301 through a plurality of seal elements 331 in such a manner as to hold or retain gas tightness of an air bearing section 332.

Further, a plurality of air receiving bores 328d are formed substantially in a central section of the outer periphery of the turbine unit 328 in equidistantly spaced relation to each other in the peripheral direction. Compressed air is supplied to the air bearing section 332 through the bearing bores 324 formed in the peripheral surface of the cover assembly 319. The inflow compressed air is received by the plurality of air receiving bores 328d. Thus, the compressed air rotatably receives the turbine unit 328.

The face milling cutter constructed as described above is used to practice surface processing of a workpiece as follows.

The arbor 310 is first fixedly mounted to the main spindle S through the keys 130 in the same manner as that described with reference to the first embodiment.

Subsequently, the turbine unit 328 is mounted to the proximal end of the cutter body 301 in a loose manner. At this time, the plurality of seal elements 331 are interposed at their respective predetermined locations between the outer periphery of the cutter body 301 and the inner periphery of the turbine unit 328.

Then, the cutter body 301 having mounted thereon the turbine unit 328 is fixedly mounted to the arbor 310 so that the cutter body 301 is fixedly mounted together to the main spindle S through the arbor 310, in the same manner as that described with reference to the first embodiment.

After the mounting operation of the cutter body 301 to the main spindle S described above, the cover assembly 319 is fixedly mounted together to the largerdiameter section 310c of the arbor 310 through the bearing 132 by the cap 135 and the bolts 135a. By doing so, the peripheral surface of the cutter body 301 and the peripheral surface of the turbine unit 328 are covered with the rotatable cover assembly 319.

The cutter body 301 is rotated about its axis in the direction Y1 in FIG. 13, and is fed in the direction perpendicular to the axis of the cutter body 301. In this manner, the insert 303 cut the workpiece.

At this time, chips generated along the front cutting edges 303a of the respective insert 303 are guided to the gaps between the chip guide element 315 and the faces 303a of the respective insert 303, and are discharged respectively into the insert pockets 313.

On the other hand, simultaneously with rotation of the cutter body 301, air is supplied to the drive chamber 322 at a pressure of about 9 kg/cm2 from the air supply device 350 which communicates with the air supply port 325 opening to the outer periphery of the cover assembly 319. Compressed air is also supplied through the bearing bores 324 in the cover assembly 319 from an air supply device (not shown) to create an air bearing for the turbine unit 328.

By the air supplied to the drive chamber 322 within the cover assembly 319 from the outside, the drive blades 330 of the turbine unit 328 are pushed forwardly toward the leading side in the rotational direction of the cutting tool, i.e., in the direction Y1 in FIG. 13 so that the turbine unit 328 is rotated at high speed. Further, the suction blades 329 arranged within the suction chamber 323 are also rotated at high speed in the direction Y1 in interlocking relation to the rotation of the drive blades 330. By the rotation of the suction blades 329 at high speed, the air within the suction chamber 323 is pressed against the suction blades 329 and is pushed forwardly on the leading side in the rotational direction of the cutting tool. Simultaneously, the air within the suction chamber 323 is brought to a drawing condition upwardly of the cutter body 301 by the suction blades 329 arranged in the spiral configuration and by the configuration of the forward-end section 328b of the turbine unit 328 curved toward the axis thereof.

The air within the suction chamber 323, which is brought to the upward drawing condition, is moved toward the leading side in the rotational direction of the cutting tool, and is guided to the chip discharge port 327. As a result, the interior of the suction chamber 323 is brought to a negative-pressure condition so that air in the vicinity of the insert 303 is successively drawn through the opening 319e at the forward-end section 319a of the cover assembly 319, which communicates with the suction passage 319d and the suction chamber 323.

In this manner, when the suction chamber 323 is brought to the negative-pressure condition, the chips guided by the chip guide element 315 and discharged to the chip pockets 144 are drawn into the suction chamber 323 together with the air drawn upwardly. The drawn chips are successively guided to the chip discharge port 327 from the suction chamber 323 together with the air, and are discharged to the chip bucket 327a.

As described above, the drive blades 330 of the turbine unit 328 arranged at the proximal end of the cutter body 301 are rotated at high speed by supply of air to the drive chamber 322 within the cover assembly 319 from the outside. Simultaneously with the rotation of the drive blades 330, the suction blades 329 are also rotated in interlocking relation to the rotation of the drive blades 330 to discharge the air within the suction chamber 323 through the air discharge port 326. Thus, negative pressure occurs within the suction chamber 323 so that the air surrounding the opening 319e at the forward-end section 319a of the cover assembly 319 is drawn into the suction chamber 323. For this reason, the chips generated by the cutting insert 303 are drawn into the suction chamber 323 from the opening 319e at the forward-end section 319a of the cover assembly 319 together with the drawn air. Further, the chips are discharged to the chip discharge bucket 327a.

Thus, there is obtained functional advantages similar to those described with reference to the first and second embodiments.

Further, the air within the suction chamber 323 is always brought to a drawing condition upwardly of the cutter body 301 by the suction blades 329 in the spiral configuration and by the configuration of the forward-end section 328b of the turbine unit 328 curved toward the axis thereof. Accordingly, it is possible to efficiently push the chips upwardly.

Moreover, in the third embodiment, as the driving air sent to the turbine unit 328, it is possible to use compressed air which is used in other equipments in a factory. Accordingly, a mounting equipment for the cutting tool is made easy.

Furthermore, the drive blades 330 within the drive chamber 322, which are rotated by the driving air, have their respective curved configurations which are suitable for being effectively rotated even if air at low pressure is supplied to the drive blades 330. Accordingly, it is possible to always maintain constant the suction force of the suction blades 329 interlocking with the drive blades 330.

Further, if pressure of the driving air is low, the mounting area of the suction blades 329 is increased whereby it is possible to rotate the suction blades 329 at high speed. Moreover, it is possible to make the best use of the suction force of the suction blades 329 interlocking with the drive blades 330 to the maximum.

Furthermore, since the chip guide element 315 is arranged at the location facing toward the cutting insert 303, the chips generated by the cutting insert 303 are successively guided toward the opening 319e at the forward- end section 319a of the cover assembly 319 through the gaps between the chip guide element 315 and the cutting insert 303. Thus, it is possible to further ensure that the chips are collected.

Moreover, since the third embodiment is arranged such that the negative pressure occurring within the suction chamber 323 generates the suction force, the strength of the suction force depends largely upon the swinging or revolving diameter of the suction blades 329, that is, upon the peripheral speed of the suction blades 329 on the outer peripheral side thereof. Accordingly, it is desirable that, in design of the suction blades 329, the swinging or revolving diameter of the suction blades 329 be as large as far as possible within a permissible range.

Further, in the third embodiment, each of the suction blades 329 is formed into a spiral or volute configuration to form the interior of the suction chamber 323 into a configuration of a volute pump. The cutting tool according to the invention should not be limited to this specific form. That is, the suction blades 329 should generate the drawing or suction force by causing the compressed air from the outside to rotate the drive blades 330 connected together to the section blades 329. Thus, various changes and modifications can be made to the suction blades 329.

Fourth Embodiment

Figure 15:
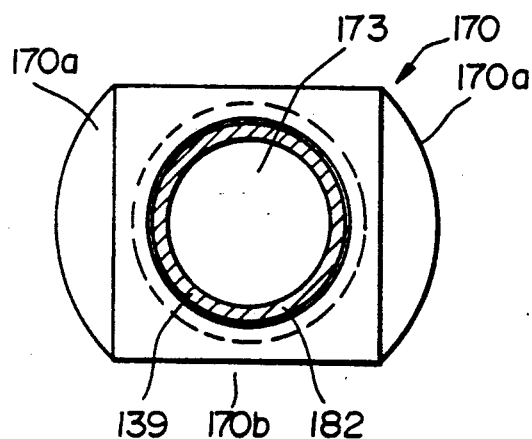
FIG. 15 is a cross-sectional view taken along the line XV—XV in FIG. 14.
Figure 16:
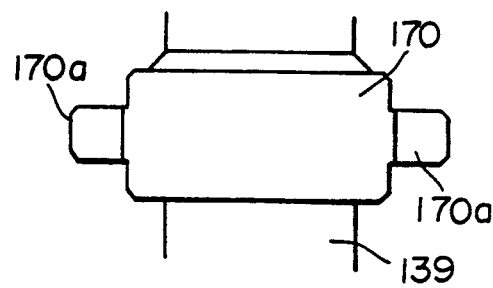
FIG. 16 is a fragmentary plan view taken from the direction XVI in FIG. 14.

Referring next to FIGS. 15 and 16, there is shown a rotary cutting tool according to a fourth embodiment of the invention.

The rotary cutting tool according to the fourth embodiment is different from those according to the first through third embodiments described previously in that air is blown to the outside through the opening at the forward end of the cover assembly from the interior thereof.

Specifically, a cover assembly 426 is arranged outwardly of a peripheral surface of a cutter body 413, and opens toward a forward end of the latter. A fitting bore 426a formed at a proximal end of the cover assembly 426 is fitted about a shield bearing 429 which is fitted about an intermediate shaft section 427 of an arbor 417 and which is retained by a retainer ring 428. The cover assembly 426 is connected, by means of the bolts 135a (only one shown), to the bearing retainer or cap 135 which is fitted about the shield bearing 429 at a location opposite to the cover assembly 426. Thus, the cover assembly 426 is rotatably supported relatively to the cutter body 413.

A flow passage or flow chamber 432 is defined between the outer peripheral surface of the cutter body 413 and a portion of the inner peripheral surface of the cover assembly 426 extending from the intermediate section thereof to the forward end thereof. The flow chamber 432 extends toward the forward end of the cutter body 413 from the proximal end thereof.

The flow chamber 432 has its forward end which communicates with an opening 426b of the cover assembly 426. On the other hand, the proximal end of the flow passage 432 is air-tightly isolated from the shield bearing 429 by a seal ring 434 which is fitted in a smaller-diameter section 433 of the cover assembly 426. The proximal end of the flow chamber 432 communicates with the outside through a plurality of suction ports 435 which extend through the intermediate shaft section 427 and a flange 423 of the arbor 417.

A thrust washer 436 is fitted about a shaft section 418 of the arbor 417. The thrust washer 436 is clamped between the forward-end face of the shaft section 418 of the arbor 417 and the proximal-end face of the cutter body 413 which is tightened by the tightening bolt 123, so that the thrust washer 436 is restricted against its axial movement. Further, the thrust washer 436 is prevented from being rotated by a key 437 which is interposed between the arbor 417 and the thrust washer 436. A key (not shown) is also interposed between the thrust washer 436 and the cutter body 413. Thus, rotation of the main spindle S is transmitted to the cutter body 413 through the arbor 417 and the thrust washer 436.

Eight (8) blades 438 are provided on the peripheral surface of the thrust washer 436 in equidistantly spaced relation to each other in the peripheral direction, to form air blowing means. Each of the blades 438 is formed into such an arcuate blade configuration that the blade 438 is arcuately curved gradually toward the trailing side in the rotational direction of the cutting tool, i.e., in the direction Y1 in FIGS. 15 and 16, as a distance approaches the forward end of the cutter body 413 from the proximal end thereof.

In the face milling cutter constructed as described above, a workpiece is cut by corner cutting edges 416 of respective insert 415 in the same manner as that described previously with reference to the first through third embodiments.

At that time, air on the side of the proximal end of the flow chamber 432 is pressed against the blades 438 formed on the peripheral surface of the thrust washer 436, during rotation of the cutter body 413. The pressed air is guided toward the forward end of the flow chamber 432 along the blades 438. For this reason, negative pressure occurs at a portion of the flow chamber 432 adjacent the proximal end of the cutter body 413. The negative pressure successively draws air into the flow chamber 432 through the suction ports 435.

Since the flow chamber 432 communicates with the opening 426b of the cover assembly 426 and is restricted at the opening 436b, the air guided toward the forward end of the flow chamber 432 is compressed in short of the opening 436b and increases in pressure. The compressed air is jetted or blown out toward the insert 415 from the respective chip pockets formed at their locations which face toward the opening 426b at the peripheral surface of the cutter body 413. Thus, the chips generated along faces 415a of the respective insert 415 are successively blown outwardly of the cutter body 413.

As described above, according to the fourth embodiment, since the chips are blown out and are not accumulated on the workpiece, the chips are prevented from biting to the corner cutting edges 416 of the respective insert 415. Accordingly, it is possible to ensure that breakage of the insert and damage of a cut surface are prevented.

In addition, the face milling cutter according to the fourth embodiment is arranged such that the blades 438 are arranged within the flow chamber 432 which is formed between the inner peripheral surface of the cover assembly 426 and the peripheral surface of the cutter body 413. With the arrangement, it is possible to shorten the entire axial length of the cutting tool as compared with the case where constitutional elements such as the flow chamber 432, the blades 438 and so on are incorporated into a space between the proximal-end face of the cutter body 413 and the forward end face of the main spindle S. The rigidity of a connecting section between the main spindle S and the cutter body 413 can sufficiently be secured. Thus, the rigidity of the entire cutting tool is not at all damaged or impaired.

In connection with the above, in the fourth embodiment, the cover assembly 426 is rotatably arranged with respect to the cutter body 413. Accordingly in the case where the amount of air jetted through the opening 426b of the cover assembly 426 is insufficient, the arrangement may be such that an air hose is connected to the proximal end of the cover assembly 426 to feed compressed air into the cover assembly 426. In the case where only air drawn through the suction ports 435 is sufficient, it is unnecessary to support the cover assembly 426 rotatably, but the cover assembly 426 may be fixedly mounted directly to the arbor 417.

In the fourth embodiment, the forward end of the flow chamber 432 communicates with the opening 426b at the forward end of the cover assembly 426. However, the face milling cutter according to the fourth embodiment should not be limited to this specific form. The following modification can be made to the invention.

Modification of Fourth Embodiment

As shown in FIG. 17, an annular space between the forward end of the cover assembly 426 and the peripheral surface of the cutter body 413 is closed air-tightly by a seal ring 439. Air sent by the blades 438 is guided to locations adjacent the insert 415 through a plurality of flow passages 440 which are formed in the diameter-enlarged section of the cutter body 413. In this connection, in the modification, the proximal end of the cover assembly 426 is fixedly mounted to a main spindle head H which rotatably supports the main spindle S, without the fact that the proximal end of the cover assembly 426 is supported by the arbor 417. Further, the suction ports to the flow chamber 432 are replaced by a nipple 442 which is screwed into the peripheral surface of the cover assembly 426 at the proximal end thereof, in consideration of the convenience of connection between an air hose and the cover assembly 426. Moreover, the blades 438 are integrally formed on the peripheral surface of the intermediate shaft section 427 of the arbor 417, in order to further improve the tool rigidity. By the integral formation of the blades 438, rotation is transmitted to the cutter body 413 from the arbor 417 through a single key 443.

Fifth Embodiment

Referring next to FIGS. 18 through 21, there is shown a rotary cutting tool according to a fifth embodiment of the invention.

As shown in FIGS. 18 and 20, a portion extending from the peripheral surface of the main spindle 223 to a peripheral surface of a forward end of a cutter body 550 is covered with a tube or cover assembly 570 which opens toward the forward end of the cutter body 550. The proximal end of the cover assembly 570 is fixedly mounted to the front face of the main spindle head 236 of the machine body supporting the main spindle 223, through the bolts 237, so that the cover assembly 570 is capable of being kept stationary relatively to rotation of the cutter body 550 and so on.

The proximal end of the cover assembly 570 is reduced in diameter in agreement with the diameter of the main spindle 223. A flow passage 573 is defined between the inner peripheral surface of the cover assembly 570 extending from the proximal end thereof to the forward end thereof and surfaces of the respective main spindle 223, adapter 221 and cutter body 550. The flow passage 573 extends from the peripheral surface of the main spindle 223 toward the forward end of the cutter body 550. The flow passage 573 has its forward end which communicates with an opening 570b at the forward end of the cover assembly 570. The proximal end of the flow passage 573 communicates with the outside through one or more suction ports 574 which are formed radially through the proximal end of the cover assembly 570.

As shown in FIGS. 20 and 21, a blade assembly 575, which forms blowing means, is formed on the peripheral surfaces of the respective adapter 221 and cutter body 550, which face toward the flow passage 573, for blowing air within the flow passage 573 to the outside of the opening 570b at the forward end of the cover assembly 570.

The blade assembly 575 comprises a plurality of first blades 576 formed on the proximal-end face of the adapter 221 in equidistantly spaced relation to each other, and a plurality of second blades 577 formed on the peripheral surfaces of the respective adapter 221 and cutter body 550 in equidistantly spaced relation to each other. Each of the first blades 576 is formed into a configuration of a spiral or volute blade which is gradually curved rearwardly in the rotational direction of the cutting tool, i.e., in the direction Y1 as a distance approaches a point radially outwardly of the adapter 221. Each of the second blades 577 is formed into a configuration of an arcuate blade which is curved arcuately toward the trailing side in the rotational direction of the cutting tool.

Surface cutting is practiced by the use of the face milling cutter constructed as above, in the same manner as that described previously with reference to the first through fourth embodiments.

In the surface cutting, air on the side of the center of the first blades 576 formed on the proximal-end face of the adapter 221 is pushed forwardly in the rotational direction of the cutting tool, by rotation of the first blades 576. Simultaneously, however, a centrifugal force directed radially outwardly of the cutter body 550 acts upon the air. Accordingly, air in the vicinity of the peripheral surface of the main spindle 223 is successively guided toward the peripheral surface of the adapter 221 along the first blades 576. For this reason, negative pressure occurs at the vicinity of the peripheral surface of the main spindle 223 within the flow passage 573. Air on the outside is successively drawn into the flow passage 573 through the suction ports 574 and is supplied toward the center of the first blades 576.

On the other hand, the air guided to the vicinity of the peripheral surface of the adapter 221 by the first blades 675 is pressed against the second blades 577 which are formed just below the peripheral edges of the respective first blades 576. The air is guided toward the forward end of the flow passage 573 along the second blades 577. Since the opening 570b of the cover assembly 570 is restricted as compared with the flow passage 573, the air guided toward the forward end of the flow passage 573 is compressed in short of the opening 570b and increases in pressure. The compressed air is jetted or blown out toward insert 553 from the respective chip pockets 220 formed at their locations which face toward the opening 570b at the peripheral surface of the cutter body 550.

Thus, the chips generated along faces 553a of the respective insert 553 are successively blown outwardly of the cutter body 550, without being accumulated on the workpiece surrounding the cutter body 550.

Replacement of the insert 553 is practiced in the same manner as that described with reference to the first embodiment.

As described above, according to the face milling cutter of the fifth embodiment, chips are blown by air jetted from the forward end of the cover assembly 570, in a manner similar to that described with reference to the face milling cutter according to the fourth embodiment. Accordingly, it is possible to ensure that breakage of the insert and damage of a cut surface are prevented.

Further, the face milling cutter is arranged such that the blade assembly 575, the flow passage 573 and so on required for discharge of the chips are not at all interposed at a connecting section between the main spindle 223 and the cutter body 550. With the arrangement, it is possible to considerably shorten the entire axial length of the cutting tool as compared with the conventional one. The rigidity of the connecting section can also sufficiently be secured. Thus, the rigidity of the entire cutting tool is not at all damaged or impaired.

Moreover, in the fifth embodiment, the first blades 576, which utilize the centrifugal force to feed air, are formed on the proximal-end face of the adapter 221. Accordingly, in the case where the fifth embodiment is applied to a larger-diameter tool in which a difference in centrifugal force is large between a central section of the cutting tool and a peripheral edge thereof, the air is efficiently forced or delivered by the first blades 576 so that the amount and pressure of air discharged through the opening 570b increase. Thus, there is obtained a chip discharge ability which is extremely superior.

Furthermore, in the fifth embodiment, in order that the centrifugal force generated during rotation of the cutting tool is utilized to improve the chip discharge efficiency, the first blades 576 each in the form of a spiral or volute blade are formed on the proximal-end face of the adapter 221, to form the space between the adapter 221 and the cover assembly 570 into a configuration of a volute pump. The face milling cutter according to the fifth embodiment should not be limited to this specific form. It is also possible to incorporate a vane pump to a space between the peripheral surface of the adapter 221 and the inner peripheral surface of the cover assembly 570. In this connection, various specific arrangements can be considered. For example, a shaft section, which is eccentric to the axis of the adapter 221, is formed on the proximal end of the adapter 221, and a plurality of blades, which are in close contact with the inner peripheral surface of the cover assembly, are arranged on the shaft section.

What is claimed is:

1. A rotary cutting tool for use with at least one cutting insert, a machine tool having a main spindle and a head, at least one table, said head being relatively movable to said table, for securing a workpiece thereon and means for collecting chips having a suction hose for collecting chips generated by said cutting insert, said rotary cutting tool comprising:

a cutter body rotatably mounted to said head about a rotational axis and having a forward end, said cutting insert being mounted to an outer periphery of said forward end of said cutter body; and chip moving means disposed outwardly of an outer peripheral surface of said cutter body for moving chips generated by said cutting insert to a desirable location, said chip moving means including:

means for covering the outer peripheral surface of said cutter body including:

cover-restricting means disposed at said covering means, wherein said cover-restricting means is engageable with said head for said main spindle of said machine tool when said cutter body is mounted to said main spindle and said cover-restricting means restricts said cover means against rotation thereof relative to said head about said rotational axis, wherein said cover-restricting means is engageable with a connecting means, which is disposed between said head and said cutter body, when said connecting means is demounted from said main spindle so as to restrict said cover means against rotation thereof relative to said cutter body about said rotational axis;

a chip accommodating chamber defined between an inner peripheral surface of said cover means and the outer peripheral surface of said cutter body;

at least one exhaust pipe connected to said chip accommodating chamber; and hose holding means mounted on said table for detachably holding said suction hose of said chip collecting means and coupling means disposed in at least one end of said suction hose and exhaust pipe.

2. A rotary cutting tool as claimed in claim 1, wherein a direction of movement of said suction hose when it is detached from said hose holding means is different from a direction of transportation of said exhaust pipe when it is detached from the suction hose so that both of said detaching operations are selectably operable by moving said exhaust pipe.

3. A rotary cutting tool for use with at least one cutting insert and for use with a machine tool having a main spindle and a head therefor, said rotary cutting tool comprising:

a cutter body rotatable about a rotational axis and having a forward end, said cutting insert being mounted to an outer periphery of the forward end of said cutter body;

chip moving means disposed outwardly of an outer peripheral surface of said cutter body for moving chips generated by said cutting insert to a desirable location, said chip moving means including:

cover means for covering the outer peripheral surface of said cutter body having a flow passage defined between an inner peripheral surface of said cover means and the outer peripheral surface of said cutter body, said cover means being supported around said cutter body for rotation relative thereto; and air sending means disposed in one body with said cutter body and disposed within said flow passage means for sending air adjacent said cutting insert toward said desirable location during rotation of said cutter body about said rotational axis; and a connecting means disposed between said head and said cutter body, for fixedly connecting said cutter body to said head, wherein said cover means is supported by said connecting means for rotation relative thereto.

4. The rotary cutting tool according to claim 3, wherein said cover means includes a chip accommodating chamber defined between the inner peripheral surface of said cover means and the outer peripheral surface of said cutter body, wherein said air sending means includes air suction means for drawing the air adjacent said cutting tip into said chip accommodating chamber together with the chips generated by said cutting tip, through an opening of said cover means at its forward end, and wherein said air suction means comprises discharge port means provided in a wall of said cover means and communicating with said chip accommodating chamber, and chip guide means arranged at the forward end of said cutter body for guiding the chips generated by said cutting tip, toward said chip accommodating chamber.

5. The rotary cutting tool, according to claim 4, further including cover-restricting means arranged at said cover means, wherein said cover-restricting means is engageable with said head for said main spindle of said machine tool when said cutter body is mounted to said main spindle, for restricting said cover means against rotation thereof relative to said head about said rotational axis, and wherein said cover-restricting means is engageable with said connecting means when said connecting means is demounted from said main spindle, for restricting said cover means against rotation thereof relative to said cutter body about said rotational axis.

6. The rotary cutting tool according to claim 4, wherein said chip guide means is arranged at the forward end of said cutter body in facing relation to a face of said cutting insert with a gap left therebetween, for narrowing said opening of said cover means, which is located at the forward end of said cutter body.

7. A rotary cutting tool for use with at least one cutting insert and for use with a machine tool having a main spindle and a head therefor, said rotary cutting tool comprising:

a cutter body rotatable about a rotational axis and having a forward end, said cutting insert being mounted to an outer periphery of the forward end of said cutter body;

chip moving means disposed outwardly of an outer peripheral surface of said cutter body for moving chips generated by said cutting insert to a desirable location, said chip moving means including:

cover means for covering the outer peripheral surface of said cutter body having a flow passage defined between an inner peripheral surface of said cover means and the outer peripheral surface of said cutter body, said cover means being supported around said cutter body for rotation relative thereto, said cover means including a chip accommodating chamber defined between the inner peripheral surface of said cover means and the outer peripheral surface of said cutter body; and air sending means disposed within said flow passage means for sending air adjacent said cutting insert toward said desirable location during rotation of said cutter body about said rotational axis, said air sending means including air suction means for drawing the air adjacent said cutting tip into said chip accommodating chamber together with the chips generated by said cutting tip, through an opening of said cover means at its forward end, said air suction means including discharge port means provided in a wall of said cover means and communicating with said chip accommodating chamber, and chip guide means arranged at the forward end of said cutter body for guiding the chips generated by said cutting tip, toward said chip accommodating chamber;

a connecting means disposed between said head and said cutter body, for fixedly connecting said cutter body to said head, wherein said cover means is supported by said connecting means for rotation relative thereto; and cover-restricting means arranged at said cover means, said cover-restricting means being engageable with said head for said main spindle of said machine tool when said cutter body is mounted to said main spindle, for restricting said cover means against rotation thereof relative to said head about said rotational axis, and wherein said cover-restricting means is engageable with said connecting means when said connecting means is demounted from said main spindle, for restricting said cover means against rotation thereof relative to said cutter body about said rotational axis;

wherein said cover means has its proximal end which is formed into an elliptic configuration bulged laterally of said cover means, so that said cover means has an elliptic projection, said projection being formed therein with guide bore means; and wherein said cover restricting means includes engaging shaft means inserted into said guide bore means for sliding movement therealong, spring means for biasing said engaging shaft means toward said head for said main spindle of said machine tool, and stopper means extending from said engaging shaft means toward the rotational axis of said cutter body, said stopper means having its forward end which is engageable with said cutter body.

8. A rotary cutting tool for use with at least one cutting insert and for use with a machine tool having a main spindle and a head therefor, said rotary cutting tool comprising:

a cutter body rotatable about a rotational axis and having a forward end, said cutting insert being mounted to an outer periphery of the forward end of said cutter body;

chip moving means disposed outwardly of an outer peripheral surface of said cutter body for moving chips generated by said cutting insert to a desirable location, said chip moving means including:

cover means for covering the outer peripheral surface of said cutter body having a flow passage defined between an inner peripheral surface of said cover means and the other peripheral surface of said cutter body, said cover means being supported around said cutter body for rotation relative thereto, said cover means including a chip accommodating chamber defined between the inner peripheral surface of said cover means and the outer peripheral surface of said cutter body; and air sending means disposed within said flow passage means for sending air adjacent said cutting insert toward said desirable location during rotation of said cutter body about said rotational axis, said air sending means including air suction means for drawing the air adjacent said cutting tip into said chip accommodating chamber together with the chips generated by said cutting tip, through an opening of said cover means at its forward end, said air suction means including discharge port means provided in a wall of said cover means and communicating with said chip accommodating chamber, and chip guide means arranged at the forward end of said cutter body for guiding the chips generated by said cutting tip, toward said chip accommodating chamber; and a connecting means disposed between said head and said cutter body, for fixedly connecting said cutter body to said head, wherein said cover means is supported by said connecting means for rotation relative thereto;

wherein said air suction means includes blade means mounted to said cutter body and disposed about said rotational axis, for rotation together with said cutter body about said rotational axis, to draw air at the forward end of said cutter body toward a proximal end thereof through said chip accommodating chamber.

9. The rotary cutting tool according to claim 8, wherein said blade means includes a plurality of blades which are formed integrally with said cutter body.

10. The rotary cutting tool according to claim 8, wherein said blade means includes a plurality of blades which are formed separately from said cutter body.

11. A rotary cutting tool as claimed in claim 1, wherein said connecting means fixedly connects said cutter body to said head; and wherein said cover means is supported by said connecting means for rotation relative thereto.

12. A rotary cutting tool for use with at least one cutting insert and for use with a machine tool having a main spindle and a head therefor, said rotary cutting tool comprising:

a cutter body rotatable about a rotational axis and having a forward end, said cutting insert being mounted to an outer periphery of the forward end of said cutter body;

chip moving means disposed outwardly of an outer peripheral surface of said cutter body for moving chips generated by said cutting insert to a desirable location, said chip moving means including:

cover means for covering the outer peripheral surface of said cutter body having a flow passage defined between an inner peripheral surface of said cover means and the other peripheral surface of said cutter body, said cover means being supported around said cutter body for rotation relative thereto; and air sending means disposed within said flow passage means for sending air adjacent said cutting insert toward said desirable location during rotation of said cutter body about said rotational axis; and a connecting means disposed between said head and said cutter body, for fixedly connecting said cutter body to said head, wherein said cover means is supported by said connecting means for rotation relative thereto The rotary cutting tool according to claim 3, further a pump chamber defined between the outer periphery of a proximal end of said cutter body and the inner peripheral surface of said cover means;

wherein said cover means has a forward end that opens toward the forward end of said cutter body;

wherein said air sending means includes a plurality of blades that are mounted to a portion of the outer peripheral surface of said cutter body, which is located within said pump chamber, said blades projecting radially outwardly of said cutter body in a peripheral direction thereof;

wherein said flow passage means includes suction passage means for causing an opening of said cover means at the forward end thereof to communicate with said pump chamber; and discharge port means extending through a wall of said cover means for permitting said pump chamber to communicate with the outside of said cover means; and wherein said blades have outer peripheral end faces that cooperate with the inner peripheral surface of said cover means to define therebetween an annular gap, said annular gap becoming gradually enlarged as a distance approaches said discharge port means in a rotational direction of said cutter body.

13. The rotary cutting tool according to claim 12, wherein each of said blades is formed into a configuration of a spiral blade which is gradually curved toward a trailing side in the rotational direction of said cutter body as a distance approaches to a point located radially outwardly of said cutter body.

14. The rotary cutting tool according to claim 12, wherein the outer peripheral surface of said cutter body is formed therein with a plurality of grooves, and wherein said blades are slidably inserted respectively in said grooves.

15. The rotary cutting tool for use with a machine body, according to claim 12, further including an adapter having its forward end which is fitted in a proximal end of said cutter body, said adapter having a proximal end which is connected to said machine body for rotation therewith, wherein said blades extend straight radially outwardly of said cutter body, and wherein said blades are formed in a peripheral surface of said adapter and are arranged along the peripheral surface thereof.

16. A rotary cutting tool as claimed in claim 1, wherein said chip collecting means includes an air suction means to extract air adjacent to said cutting insert through said exhaust pipe and said suction hose.

17. A rotary cutting tool as claimed in claim 1, further comprising means for guiding chips generated by said cutting insert to said chip accommodating chamber.

18. A rotary cutting tool as claimed in claim 25, wherein said guiding means is disposed at the forward end of said cutter body so as to face a face of said cutting insert with a gap provided therebetween, for narrowing said opening of said cover means, which is located at the forward end of said cutter body.

19. The rotary cutting tool according to claim 3, wherein said flow passage means extends from a proximal end of said cutter body toward the end thereof;

wherein said cover means further includes suction port means formed in the proximal end of said cutter body for permitting the outside of said cover means to communicate with the inside of said cover means;

wherein said air sending means includes air blowing means for blowing air introduced through said suction port means toward the forward end of said cover means; and wherein said air blowing means comprises a plurality of first blades provided on a surface of the proximal end of said cutter body in spaced relation to each other in a peripheral direction of said cutter body, each of said first blades being gradually curved toward a trailing side in a rotational direction of said cutter body as a distance approaches a point located radially outwardly of said cutter body from a center thereof, and a plurality of second blades provided on the peripheral surface of said cutter body, each od said second blades being gradually curved toward the trailing side in the rotational direction of said cutter body from the proximal end thereof, and wherein said suction port means is provided at a location adjacent said rotational axis on the side of said proximal end of said cutter body.

20. The rotary cutting tool according to claim 5, wherein said cover means has its proximal end which is formed into an elliptic configuration bulged laterally of said cover means, so that said cover means has an elliptic projection, said projection being formed therein with guide bore means; and wherein said cover restricting means includes engaging shaft means inserted into said guide bore means for sliding movement therealong, spring means for biasing said engaging shaft means toward said head for said main spindle of said machine tool, and stopper means extending from said engaging shaft means toward the rotational axis of said cutter body, said stopper means having its forward end which is engageable with said cutter body.

21. The rotary cutting tool according to claim 4, wherein said air suction means includes blade means mounted to said cutter body and disposed about said rotational axis, for rotation together with said cutter body about said rotational axis, to draw air at the forward end of said cutter body toward a proximal end thereof through said chip accommodating chamber.

22. The rotary cutting tool according to claim 21, wherein said blade means includes a plurality of blades which are formed integrally with said cutter body.

23. The rotary cutting tool according to claim 21, wherein said blade means includes a plurality of blades which are formed separately from said cutter body.

24. The rotary cutting tool according to claim 3, further comprising:

a pump chamber defined between the outer periphery of a proximal end of said cutter body and the inner peripheral surface of said cover means;

wherein said cover means has a forward end that opens toward the forward end of said cutter body;

wherein said air sending means includes a plurality of blades that are mounted to a portion of the outer peripheral surface of said cutter body, which is located within said pump chamber, said blades projecting radially outwardly of said cutter body in a peripheral direction thereof;

wherein said flow passage means includes suction passage means for causing an opening of said cover means at the forward end thereof to communicate with said pump chamber; and discharge port means extending through a wall of said cover means for permitting said pump chamber to communicate with the outside of said cover means; and wherein said blades have outer peripheral end faces that cooperate with the inner peripheral surface of said cover means to define therebetween an annular gap, said annular gap becoming gradually enlarged as a distance approaches said discharge port means in a rotational direction of said cutter body.

25. The rotary cutting tool according to claim 24, wherein each of said blades is formed into a configuration of a spiral blade which is gradually curved toward a trailing side in the rotational direction of said cutter body as a distance approaches to a point located radially outwardly of said cutter body.

26. The rotary cutting tool according to claim 24, wherein the outer peripheral surface of said cutter body is formed therein with a plurality of grooves, and wherein aid blades are slidably inserted respectively into said grooves.

27. The rotary cutting tool for use with a machine body according to claim 31, further comprising an adapter having its forward end which is fitted in a proximal end of said cutter body, said adapter having a proximal end which is connected to said machine body for rotation therewith, wherein said blades extend straight radially outwardly of said cutter body, and wherein said blades are formed in a peripheral surface of said adapter and are disposed along the peripheral surface thereof.

* * * * *